(12) United States Patent
Ho et al.

(10) Patent No.: US 7,936,732 B2
(45) Date of Patent: May 3, 2011

(54) SELECTING AGGREGATION NODES IN A NETWORK

(75) Inventors: Kah Kin Ho, Buchs (CH);
Jean-Philippe Vasseur, Dunstable, MA (US)

(73) Assignee: Cisco Technology, Inc., San Jose, CA (US)

( * ) Notice: Subject to any disclaimer, the term of this patent is extended or adjusted under 35 U.S.C. 154(b) by 795 days.

(21) Appl. No.: 11/862,713

(22) Filed: Sep. 27, 2007

(65) Prior Publication Data
US 2009/0086663 A1    Apr. 2, 2009

(51) Int. Cl.
H04Q 7/24    (2006.01)
H04Q 7/00    (2006.01)

(52) U.S. Cl. .................. 370/338; 370/328; 370/400

(58) Field of Classification Search .......... 370/392, 370/400–411, 254–258, 328, 338, 229–235, 370/335, 336
See application file for complete search history.

(56) References Cited

U.S. PATENT DOCUMENTS

| | | | |
|---|---|---|---|
| 6,023,724 A | 2/2000 | Bhatia et al. | |
| 6,046,985 A | 4/2000 | Aldred et al. | |
| 6,314,105 B1 | 11/2001 | Luong | |
| 6,473,431 B1 | 10/2002 | Perlman et al. | |
| 6,519,231 B1 | 2/2003 | Ding et al. | |
| 6,654,359 B1 | 11/2003 | La Porta et al. | |
| 6,678,241 B1 | 1/2004 | Gai et al. | |
| 6,690,653 B1 | 2/2004 | Anbiah et al. | |
| 6,704,301 B2 | 3/2004 | Chari et al. | |
| 6,711,152 B1 | 3/2004 | Kalmanek et al. | |
| 6,721,290 B1 | 4/2004 | Kondylis et al. | |
| 6,721,344 B2 | 4/2004 | Nakao et al. | |
| 6,744,775 B1 | 6/2004 | Beshai et al. | |
| 6,826,621 B1 | 11/2004 | Kephart et al. | |
| 6,865,151 B1 | 3/2005 | Saunders | |
| 6,961,310 B2 | 11/2005 | Cain | |
| 6,963,575 B1 | 11/2005 | Sistanizadeh et al. | |
| 7,002,949 B2 | 2/2006 | Garcia-Luna-Aceves et al. | |
| 7,184,421 B1 * | 2/2007 | Liu et al. | 370/338 |
| 7,190,696 B1 | 3/2007 | Manur et al. | |
| 7,286,479 B2 | 10/2007 | Bragg | |
| 7,333,501 B2 | 2/2008 | Cook et al. | |

(Continued)

FOREIGN PATENT DOCUMENTS

WO    WO 2007/117727 A2    10/2007

(Continued)

OTHER PUBLICATIONS

U.S. Appl. No. 11/513,099, Retana, A and White, R.

(Continued)

*Primary Examiner* — Ayaz R Sheikh
*Assistant Examiner* — Chuong T Ho
(74) *Attorney, Agent, or Firm* — Patent Capital Group

(57) ABSTRACT

In one embodiment, a method includes determining, at a local node in a network of multiple nodes, a first neighbor node of one or more neighbor nodes with which the local node is in direct communication based on a first number of nodes with which the first neighbor node is in direct communication. The first neighbor node is selected as an aggregation node for information about the local node. The aggregation node outputs data that is a combination of data received from multiple different nodes. The method allows wireless routers in mobile ad hoc networks to automatically determine their own aggregation nodes for routing information and thus automatically enables routing protocols to scale for many thousands of mobile wireless nodes.

20 Claims, 16 Drawing Sheets

U.S. PATENT DOCUMENTS

| | | | |
|---|---|---|---|
| 7,444,153 B2 * | 10/2008 | Yokota | 455/445 |
| 7,533,166 B2 | 5/2009 | Beyda | |
| 7,609,838 B2 * | 10/2009 | Westhoff et al. | 380/270 |
| 2001/0024443 A1 | 9/2001 | Alriksson et al. | |
| 2002/0075807 A1 | 6/2002 | Troxel et al. | |
| 2002/0082035 A1 * | 6/2002 | Aihara et al. | 455/518 |
| 2002/0101821 A1 | 8/2002 | Feldmann et al. | |
| 2002/0112060 A1 | 8/2002 | Kato | |
| 2003/0026268 A1 | 2/2003 | Navas | |
| 2003/0037168 A1 | 2/2003 | Brabson et al. | |
| 2003/0095554 A1 | 5/2003 | Shimizu | |
| 2003/0112799 A1 | 6/2003 | Chandra et al. | |
| 2003/0174653 A1 | 9/2003 | Basu et al. | |
| 2003/0218988 A1 | 11/2003 | Han et al. | |
| 2003/0223379 A1 | 12/2003 | Yang et al. | |
| 2004/0081152 A1 * | 4/2004 | Thubert et al. | 370/392 |
| 2004/0081154 A1 | 4/2004 | Kouvelas | |
| 2004/0085912 A1 | 5/2004 | Xu et al. | |
| 2004/0162819 A1 | 8/2004 | Omae et al. | |
| 2004/0196843 A1 | 10/2004 | Zinin | |
| 2004/0208175 A1 | 10/2004 | McCabe | |
| 2005/0030921 A1 | 2/2005 | Yau | |
| 2005/0047353 A1 | 3/2005 | Hares | |
| 2005/0074019 A1 | 4/2005 | Handforth et al. | |
| 2005/0089015 A1 | 4/2005 | Tsuge et al. | |
| 2005/0220077 A1 | 10/2005 | Vereecke et al. | |
| 2005/0221752 A1 | 10/2005 | Jamieson et al. | |
| 2006/0140111 A1 | 6/2006 | Vasseur et al. | |
| 2006/0159082 A1 | 7/2006 | Cook et al. | |
| 2006/0159095 A1 | 7/2006 | Cook et al. | |
| 2006/0165009 A1 | 7/2006 | Nguyen et al. | |
| 2006/0198321 A1 | 9/2006 | Nadeau et al. | |
| 2007/0019593 A1 | 1/2007 | Sarkar | |
| 2007/0053295 A1 | 3/2007 | Cleveland et al. | |
| 2007/0091795 A1 | 4/2007 | Bonaventure et al. | |
| 2007/0165532 A1 | 7/2007 | Retana et al. | |
| 2007/0214283 A1 | 9/2007 | Metke et al. | |
| 2008/0002640 A1 | 1/2008 | Westphal | |
| 2008/0062947 A1 | 3/2008 | Retana et al. | |
| 2008/0130500 A1 | 6/2008 | Retana et al. | |
| 2010/0008231 A1 | 1/2010 | Retana et al. | |
| 2010/0098090 A1 * | 4/2010 | Westhoff et al. | 370/400 |

FOREIGN PATENT DOCUMENTS

| | | |
|---|---|---|
| WO | WO 2008/027668 A1 | 3/2008 |
| WO | WO 2008/033618 | 3/2008 |
| WO | WO 2008/067041 | 6/2008 |

OTHER PUBLICATIONS

J. Moy, Open Shortest Path First (OSPF) Version 2, Request for Comments, Apr. 1, 1998, p. 185 No. 2328, Publisher: Internet Engineering TaskForce, Published in: Internet (www.ietf.org).

"NovaRoam: Dynamic Routing for Mobile Networks," 2000, 29 pages, novaroam.com/downloads/wp_tora.pdf, Nova Engineering, Inc., Cincinnati, Ohio, USA.

C. Small, "Radio Shortest Path First (RSPF) Specification, IV, Link state propagation," 2000, 9 pages, rspf.sourceforge.net/rspfspec4.html, Internet.

Park and Corson, "Temporally-Ordered Routing Algorithm (TORA) Version 1 Functional Specification," Jul. 20, 2001, 22 pages, ietf.org. draft-ietf-manet-tora-spec-04-IETF, Internet-Draft.

Kennicott and Fisk, "Dynamic Allocation of Nodes on a Large Space-shared Cluster," 2001, 23 pages, cacr.caltech.edu/cluster2001/program/talks/kennicott.pdf, CalTech, Pasadena, CA, US.

Kaya et al., "SOS: An Experimental Scalable Network Structure for Efficient Querying of Micro Sensors," 2003, 12 pages, cse.yeditepe.edu.tr/tnl/wisent/htmls/pubs/pubs/sqs.pdf, Istanbl.

Karp and Kung, "GPSR: Greedy Perimeter Stateless Routing for Wireless Networks," 2000, 12 pages, eecs.harvard.edu/networking/papers/karp-kung-gpsr-500.pdf, Harvard, Cambridge, MA, US.

Curran, "SWARM: Cooperative Reinforcement Learning for Routing in Ad-hoc Networks," 2003, 84 pages, cs.tcd.ie/publications/tech-reports/reports.03/TCD-CS-2003-6.pdf, Trinity Col, Dublin.

Corson, Park, IMPETT, "Temporally-Ordered Routing Algorithm," 2006, 2 pages, www.isr.umd.edu/ISR/accomplishments/037_Routing, University of Maryland, Inst. Systems Res., Baltimore, MD, US.

International Search Report for International Application No. PCT/US07/60289 mailed Apr. 18, 2008 (3 pages).

International Preliminary Report on Patentability issued Jul. 22, 2008 (1 page) and Written Opinion mailed Apr. 18, 2008 (5 pages) for International Application No. PCT/US07/60289.

International Preliminary Report on Patentability issued Mar. 3, 2009 (1 page) Written Opinion mailed Feb. 4, 2008 (6 pages) for International Application No. PCT/US07/073940.

International Search Report for International Application No. PCT/US07/073940 mailed Feb. 4, 2008 (1 page).

Notification of Transmittal of the International Search Report and the Written Opinion of the International Searching Authority, or the Declaration (1 page), International Search Report (2 pages), and Notification of Transmittal of the International Search Report and the Written Opinion of the International Searching Authority, or the Declaration (3 pages) for International Application No. PCT/US07/74890 mailed Jan. 30, 2008.

International Search Report for International Application No. PCT/US07/80857 mailed Mar. 21, 2008 (1 page).

International Preliminary Report on Patentability issued Jun. 3, 2009 (1 page) and Written Opinion of the International Searching Authority mailed Mar. 21, 2008 (4 pages) for International Application No. PCT/07/80857.

* cited by examiner

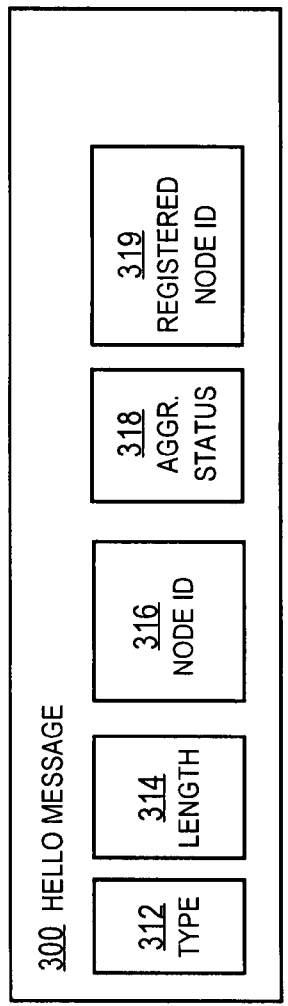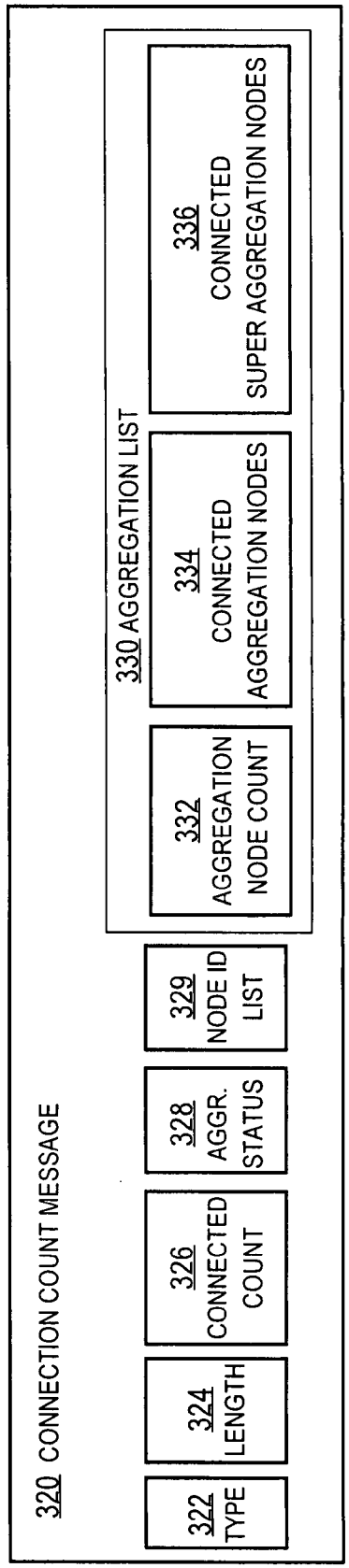

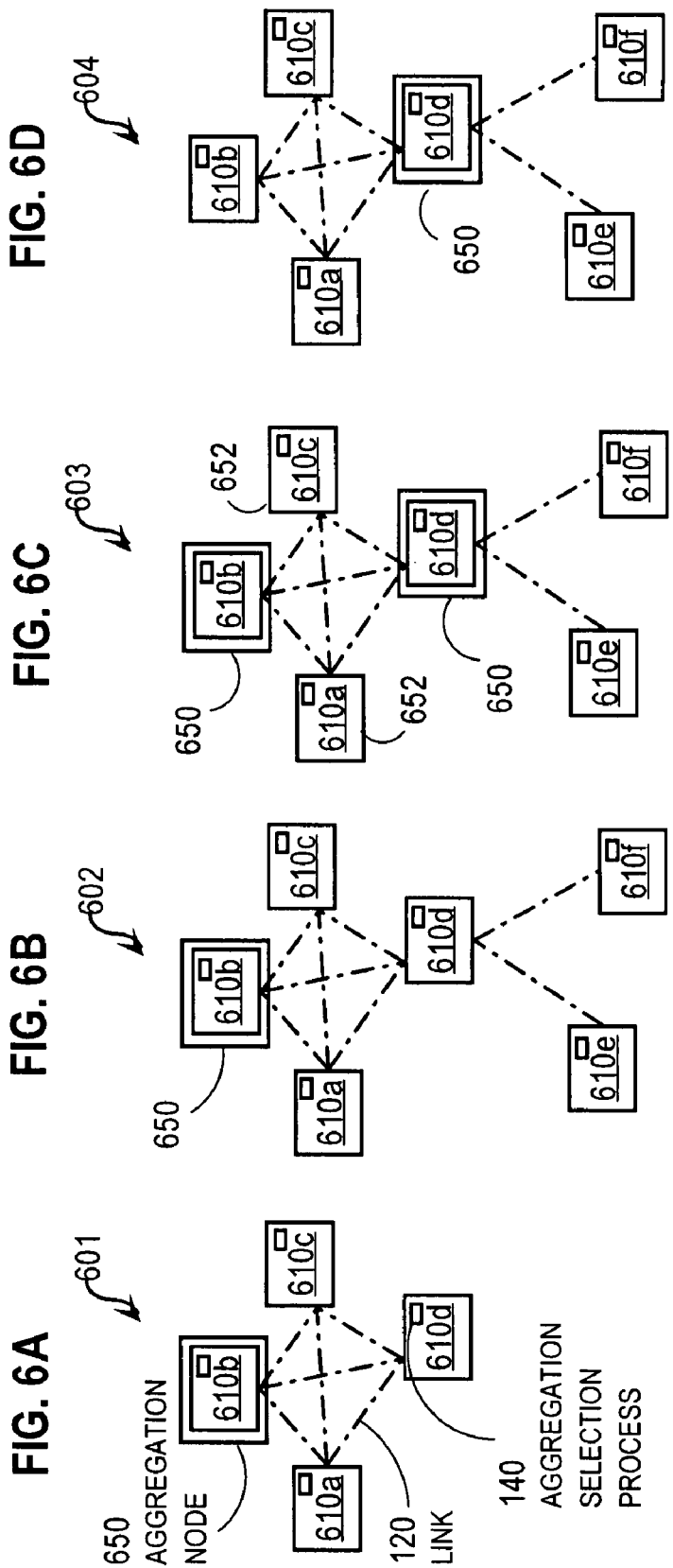

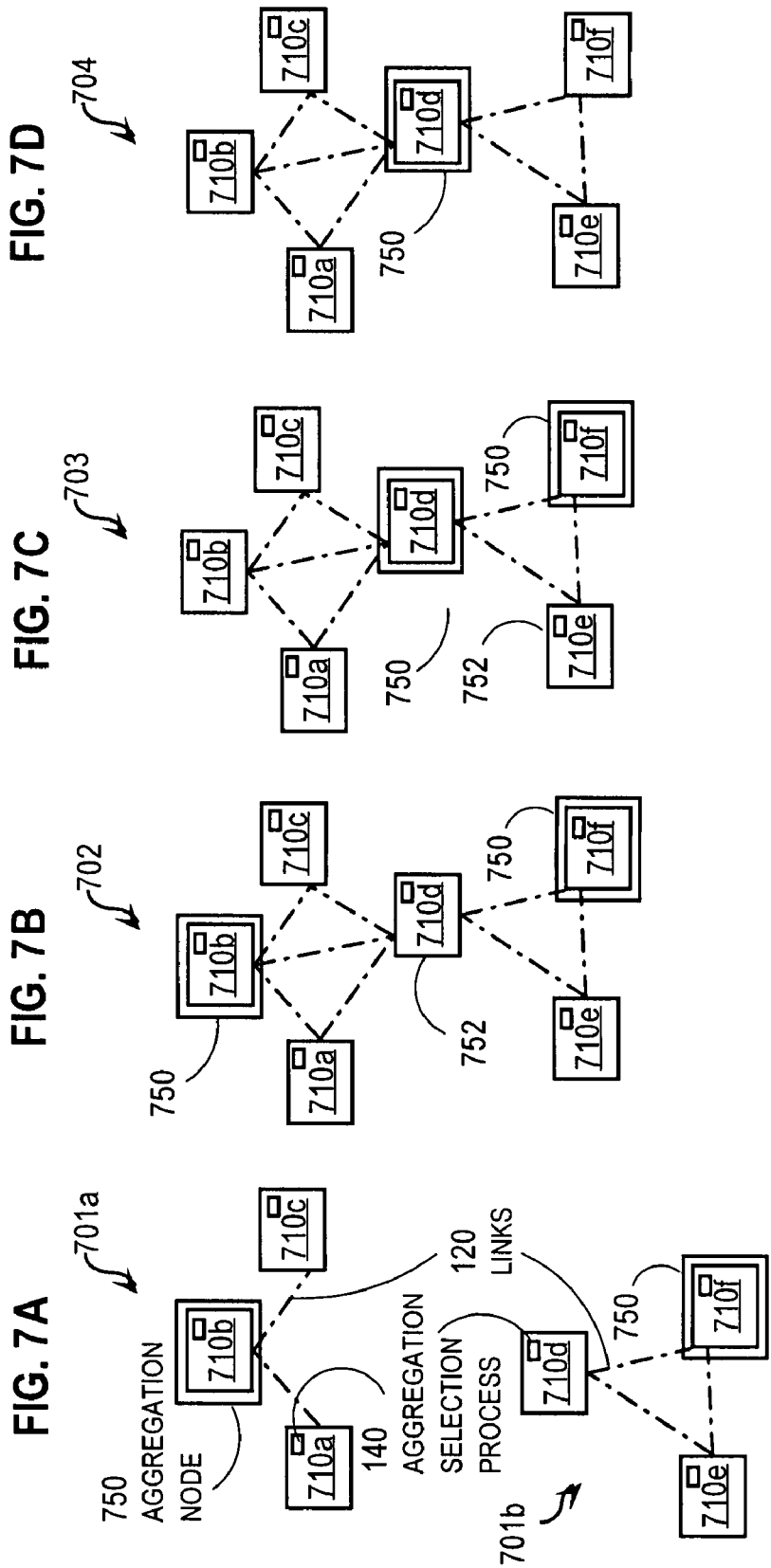

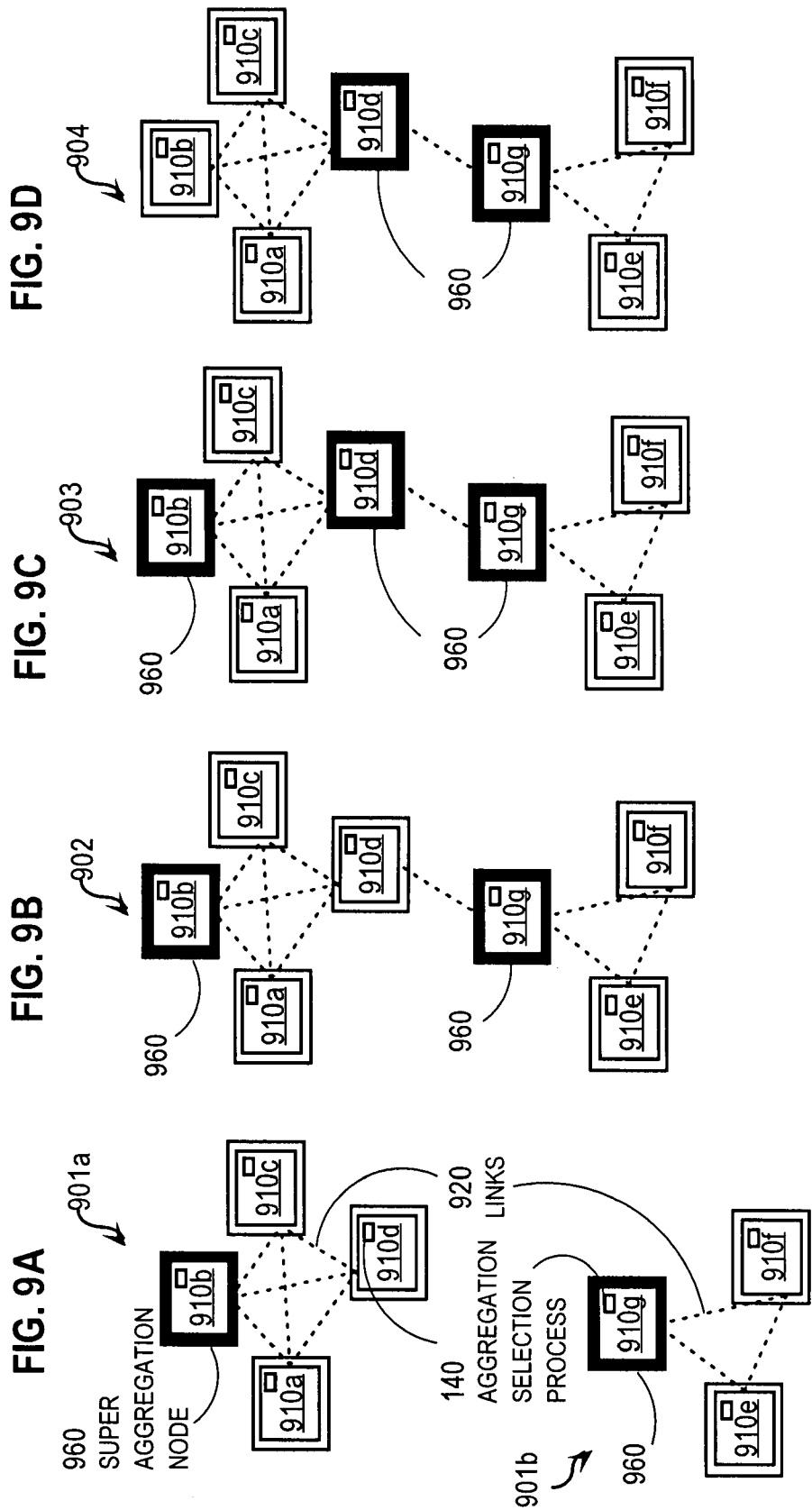

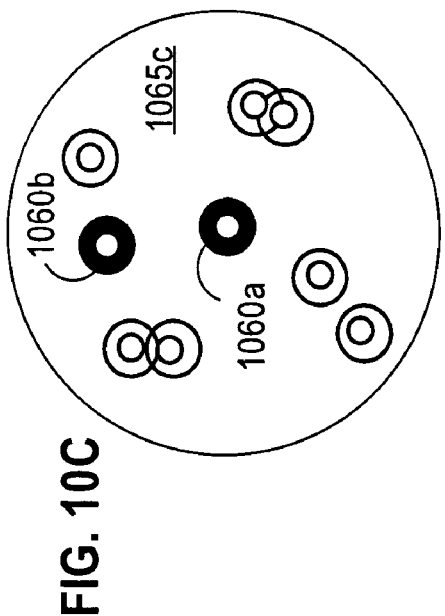
FIG. 10C
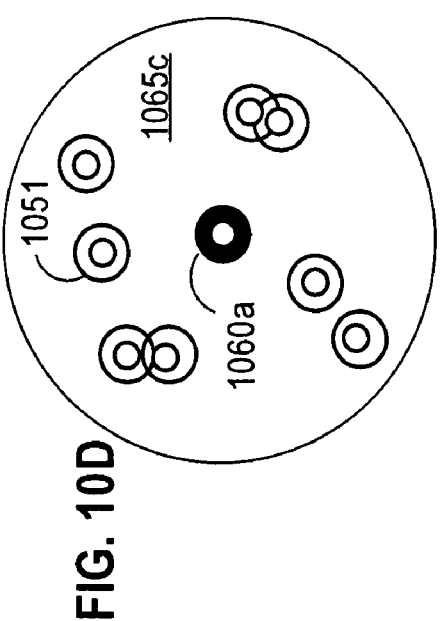
FIG. 10D
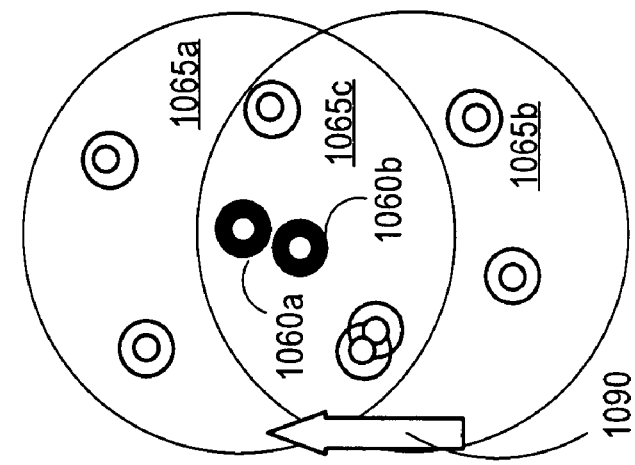
FIG. 10B
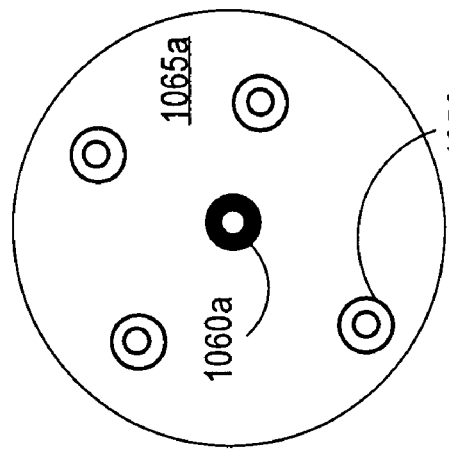
FIG. 10A
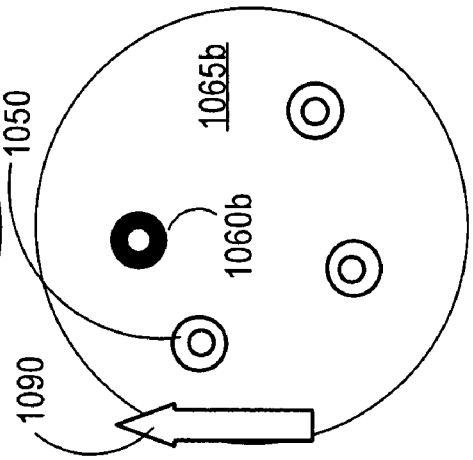

SELECTING AGGREGATION NODES IN A NETWORK

BACKGROUND OF THE INVENTION

1. Field of the Invention

The present invention relates to communication networks, with special utility for mobile wireless networks, such as a mobile ad-hoc network (MANET).

2. Description of the Related Art

Networks of general purpose computer systems and specialized devices connected by external communication links are well known and widely used in commerce. The networks often include one or more network devices that facilitate the passage of information between the computer systems and devices. A network node is a network device or computer or specialized device connected by the communication links. An end node is a network node that is configured to originate or terminate communications over the network. An intermediate network node facilitates the passage of data between end nodes.

Communications between nodes are typically effected by exchanging discrete packets of data. Information is exchanged within data packets according to one or more of many well known, new or still developing protocols. In this context, a protocol consists of a set of rules defining how the nodes interact with each other based on information sent over the communication links. According to internetwork protocols, each node is given a logical internetwork address and intermediate network nodes called routers track which internetwork address is reachable through which communication link. A well known internetwork protocol is the Internet Protocol (IP). Information used by the routers is distributed using one or more of several well known routing protocols. A well known routing protocol is Open Shortest Path First (OSPF) which exchanges full topology information about every node and communication link in an area.

To reduce the consumption of network resources and improve scalability, some routing protocols divide a large network up into smaller subnetworks. By aggregating routing information, the amount of network resources consumed to maintain routing data and make routing decisions can be reduced and network scalability can be enhanced. For example, OSPF divides a large network up into multiple areas and exchanges full topology information only within one area. At a boundary with a different area, address reachability data is aggregated and exchanged with an adjacent node in the different area.

The connected communications links and division of routers into areas is a manual process performed by human network administrators. As a result, the division is subjective based on the administrator's perceptions and is not guaranteed to be optimal in any objective sense. As networks become larger, sub-optimal divisions can lead to significant wasted resources and increased costs to service the same customer base for a given network. In some circumstances, sub-optimal divisions can lead to instability and lack of resiliency in the network. Furthermore, in mobile ad hoc networks, in which routers enter and leave wireless communications frequently, it is impossible for a human administrator to keep up with the connections, and to redistribute area boundaries and aggregation nodes.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A illustrates an example hello message;

FIG. 3B illustrates an example connection count message;

FIG. 6A, FIG. 6B, FIG. 6C and FIG. 6D illustrate an example aggregated network at an initial time and at three successively later times;

FIG. 7A, FIG. 7B, FIG. 7C and FIG. 7D illustrate a different example aggregated network at an initial time and at three successively later times;

FIG. 9A, FIG. 9B, FIG. 9C and FIG. 9D illustrate an example super aggregated network at an initial time and at three successively later times;

FIG. 10A, FIG. 10B, FIG. 10C and FIG. 10D illustrate a different example super aggregated network at an initial time and at three successively later times.

DESCRIPTION OF EXAMPLE EMBODIMENTS

Figure 1:
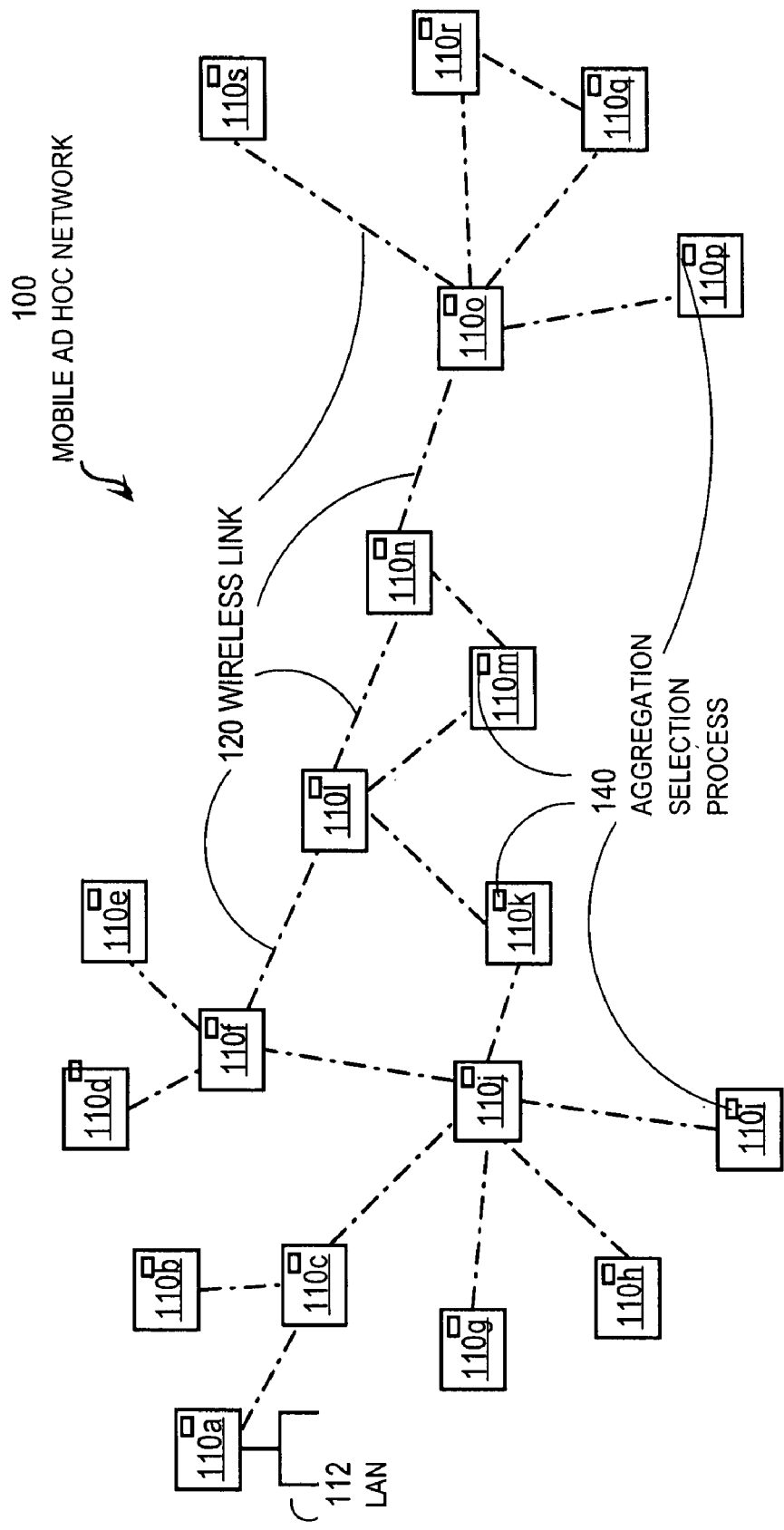
FIG. 1 illustrates an example mobile ad hoc network (MANET)

A method and apparatus are described for determining aggregation performed at a node in a network. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

An aggregation point is a logical or physical interface between a network node and a communication link, through which is output data that is a combination of data received through one or multiple different logical or physical interfaces upstream of the interface. An aggregation node is a node with an aggregation interface.

Embodiments of the invention are described below in the context of a mobile ad hoc network (MANET) in which the nodes are wireless routers and there is no restriction on how rapidly a node may enter or leave a network or change wireless neighbors. A neighbor is a different node with which a subject node is in direct wireless or wired communication. However the invention is not limited to the context of a MANET. In various other embodiments, an aggregation node is automatically determined in other networks with and without wireless communications links among nodes that are routers or not routers, regardless of the frequency with which nodes enter and leave the network or change neighbors, and regardless of whether the information exchanged is routing information.

1.0 Overview

In one set of embodiments, a method includes determining, at a local node in a network of multiple nodes, a first neighbor node of one or more neighbor nodes with which the local node is in direct communication based on a first number of nodes with which the first neighbor node is in direct communication. The first node is selected as an aggregation node for information about the local node. The aggregation node outputs data that is a combination of data received from multiple different nodes.

In other embodiments, an apparatus, or logic encoded in one or more tangible media, or instructions encoded on one or more computer-readable media is configured to perform one or more steps of the above method.

2.0 Network Overview

As stated above, communications between nodes are typically effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information used by the protocol. Often, the data in the payload for the particular protocol includes a header and payload for a different protocol associated with a different layer of detail for information exchange. The header for a particular protocol typically indicates a type for the next protocol contained in its payload. The protocol in the payload is said to be encapsulated in the protocol of the header for the payload.

The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled *Interconnections Second Edition*, by Radia Perlman, published September 1999.

The internetwork header provides information defining the source and destination address within the network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header.

Routers and switches are network devices that determine which communication link or links to employ to support the progress of data packets through the network. An intermediate network node that determines which links to employ based on information in the internetwork header (layer 3) is called a router.

Some protocols pass protocol-related information among two or more network nodes in special control packets that are communicated separately and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications at the end nodes.

A link-state protocol is an example of a routing protocol, which only exchanges control plane messages used for routing data packets sent in a different routed protocol (e.g., IP). As stated in the background, to reduce the consumption of network resources and improve scalability, some routing protocols divide a large network up into smaller subnetworks. For example, the Open System Interconnection (OSI) protocol suite and the Open Shortest Path First (OSPF) routing protocol divide a network into autonomous systems and areas. An autonomous system (AS) is a portion of a network under the network administration of a single authority, such as an enterprise or Internet service provider (ISP). An AS is divided into areas. Each area is a group of contiguous subnetworks and attached end nodes specified by a network administrator, usually manually. In OSI, routers within an AS communicate with each other using an intermediate system to intermediate system (IS-IS) protocol. According to IS-IS, routing within an area (level 1 routing) uses link-state data that distinguishes each link on each router in the area. Routing between areas (level 2 routing) goes through a level 2 router that aggregates the addresses reachable through that level 2 router. By aggregating routing information for addresses reachable over many links of a level 2 router, the amount of network resources consumed to maintain link-state data and make routing decisions can be reduced and network scalability can be enhanced. As stated in the background, the division of routers into areas is conventionally a manual process performed by human network administrators. As used herein, the term domain refers to any grouping of nodes for the proposes of aggregating information. As such areas are domains at one level of aggregation and an AS is a domain for a higher level of aggregation.

In an internetwork, networks in different autonomous systems (AS) also route data packets among each other. In general, the network nodes in an autonomous system are manually configured with an Autonomous System identifier (ASID). Routing information for an AS is summarized at its boundaries with one or more other ASs at intermediate network nodes called border gateway nodes or border gateway (BG) routers. Routing information shared within the borders of one AS is exchanged using an interior gateway protocol (IGP). Example IGPs include the link state protocols OSPF and IS-IS described above. Another IGP, developed by Cisco Systems of San Jose, Calif. for use in its routers, is the Enhanced Interior Gateway Routing Protocol (EIGRP).

A level 3 routing protocol is used to exchange route summary and routing policy information across AS borders. For example, the Border Gateway Protocol (BGP) is a level 3 routing protocol. The BGP sends summary and policy information between adjacent boundary gateway nodes in different ASs using the External BGP (EBGP). The BGP sends summary and policy information between different boundary gateways in the same AS using the Internal BGP (IBGP).

FIG. 1 illustrates an example mobile ad hoc network 100. Network 100 includes 19 wireless routers 110a, 110b, 110c, 110d, 110e, 110f, 110g, 110h, 110i, 110j, 110k, 110l, 110m, 110n, 110o, 110p, 110q, 110r, 110s, collectively referenced hereinafter as routers 110. The routers communicate by wireless links 120. To support routing of data packets between end nodes, not shown, such as end nodes on local area network 112 connected by wires to router 110a, the routers 110 pass routing information among themselves in a routing protocol, such as the OSPF protocol. Although 19 routers and 20 links in one domain are shown in network 100 of FIG. 1 for purposes of illustration, in other embodiments, a network includes more or fewer routers communicating over more or fewer links in one or more domains.

Wireless links 120 represent physical or logical links. Some wireless links use different physical channels, such as different radio frequencies, or directional antennas that spatial segregate signals at the same frequency, or time gating that reserves different time slots on the same frequency for different links. Some wireless links send all traffic on the same frequency in all directions, one data packet at a time, and logically segregate traffic onto different logical links based on a label included in the data packet; such links are called logical links.

For scalability to networks with large numbers of nodes, the routers are grouped into domains, within which routing information is shared at the same level of detail. Between domains routing information is shared at another level of detail, typically with less detail. When networks are wired together, a network administrator assigns each node to a domain or multiple domains during configuration, a manual process that grows tedious as the number of nodes increase. The same process, though tedious, works for fixed wireless routers, such as access points installed in homes and buildings. However, with mobile wireless routers, it is impractical for a human to follow the routers around and reassign them to different areas as they move—such a process would render the routers useless for mobile operations. Instead, each wireless router is configured with an area or areas, each called a configured domain, a configured area or a base area. Routers that are expected to be in each other's vicinity in the field are given the same configured area. A configured domain can be defined based on any affinity among nodes, such as the organization that purchases them, the zip code where they are first delivered, an age of a primary user, or any combination.

Current methods to pass routing information among wireless routers fail as the number of routers in the network increases to the order of magnitude of a few hundred nodes nodes. Many applications including search and rescue and military applications require many thousands of mobile wireless routers, each associated with a wired LAN on a troop or vehicle and each moving in operational groups defined on the scene. Thus, there is a need for more adaptive means for determining domains and areas boundaries and the aggregation nodes between them.

According to the illustrated embodiment, each router 110 includes an aggregation selection process 140 used to determine the aggregation nodes. Domains for different levels of aggregation are then defined based on the aggregation nodes selected by the process 140. According to the illustrated embodiment, the aggregation selection process 140 determines aggregation nodes based on the number of direct communications with which each node is engaged.

Figure 2A:
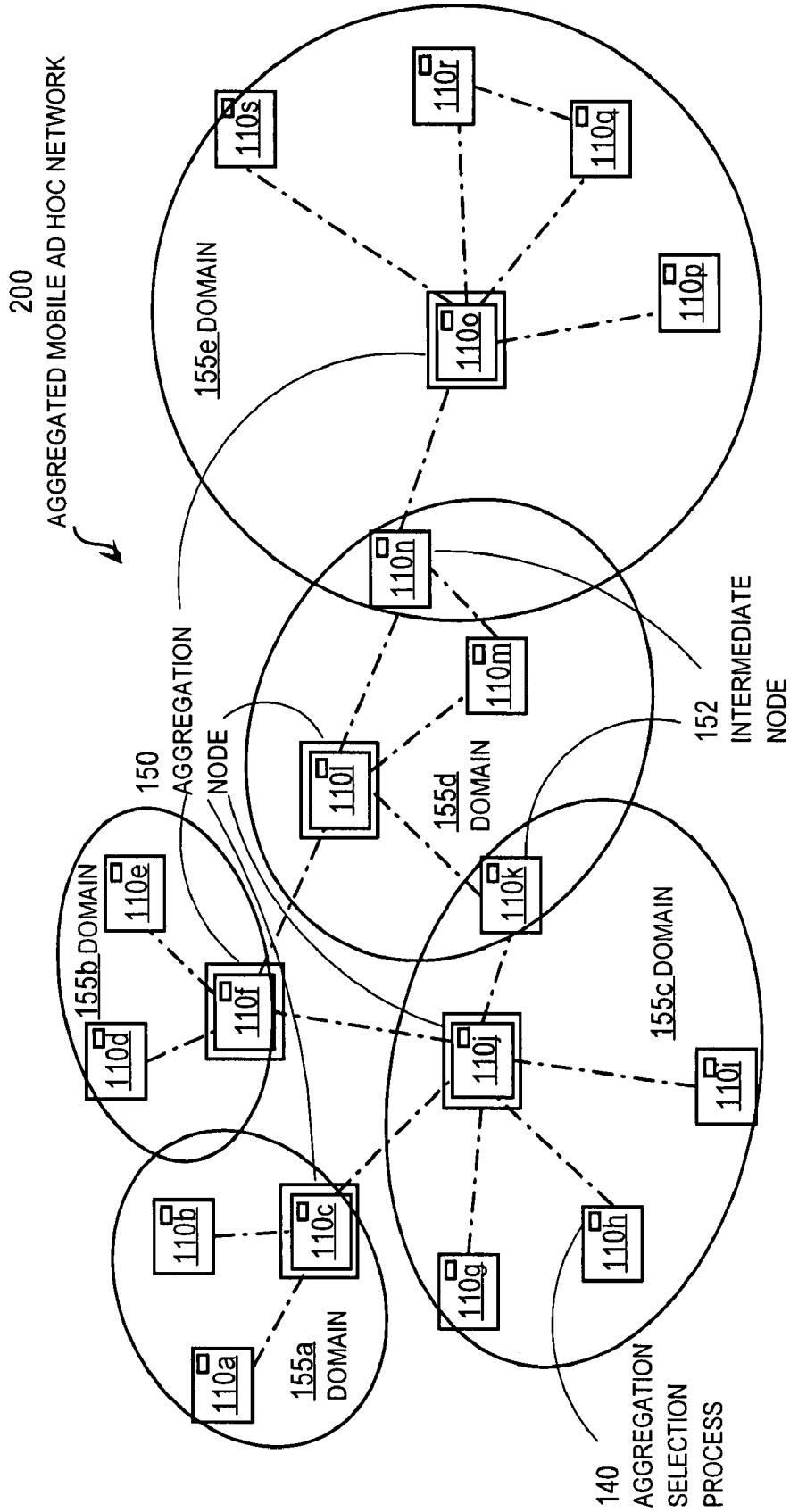
FIG. 2A illustrates an example aggregated MANET at a first level of aggregation.

For example, in an illustrated embodiment, each node determines the number of nodes with which it is in direct communication and the number of nodes with which each neighbor is directly communicating. A neighbor that is most connected, that is communicating with the most neighbors, is selected as an aggregation node for information, such as routing information, from that node. FIG. 2A illustrates an example aggregated mobile ad hoc network 200 at a first level of aggregation. The nodes 110 and communication links 120 and aggregation selection process 140 are as in network 100 depicted in FIG. 1. Network 200 includes aggregation nodes 150 and intermediate nodes 152 selected among the nodes 110. The aggregation selection process 140 determines the aggregation nodes 150 and the associated domain 155a, domain 155b, domain 155c, domain 155d and domain 155e, collectively referenced hereinafter as domains 155.

The aggregation nodes 150, intermediate nodes 152 and domains are selected in the illustrated embodiment as described next. Node 110a determines it is in direct communication with only one other node, node 110c, and determines that node 110c is in direct communication with three nodes (node 110a and node 110b and node 110j). Therefore node 110a determines that node 110c is an aggregation node 150 for information form node 110a. Similarly node 110c is an aggregation node for node 110b. As a result, domain 155a includes one aggregation node 110c and the two non-aggregated nodes (called selfish nodes, hereinafter), node 110a and node 110b.

Similarly, node 110f is an aggregation node 150 for selfish, node 110d and selfish node 110e in domain 155b. Node 110j is an aggregation node for selfish node 110g, selfish node 110h, selfish node 110i and selfish node 110k, in domain 155c. Node 110l is an aggregation node 150 for selfish node 110k, selfish node 110m and selfish node 110n, in domain 155d. Node 110o is an aggregation node 150 for selfish node 110n, selfish node 110p, selfish node 110q, selfish node 110 and selfish node 110s, in domain 155e. Thus selfish nodes and aggregation nodes 150 in domains 155 are automatically and objectively determined. An intermediate node 152 is a selfish node that is in direct communication with more than one aggregation node 150. Thus selfish node 110k and selfish node 110n are intermediate nodes 152.

In the illustrated embodiment, each selfish node 110 passes, proactively, unsolicited information about itself to an aggregation node 150.

The method allows wireless routers in mobile ad hoc networks to automatically determine their own aggregation nodes and domains for routing information and thus automatically enables routing protocols to scale for many thousands of mobile wireless nodes.

Figure 2B:
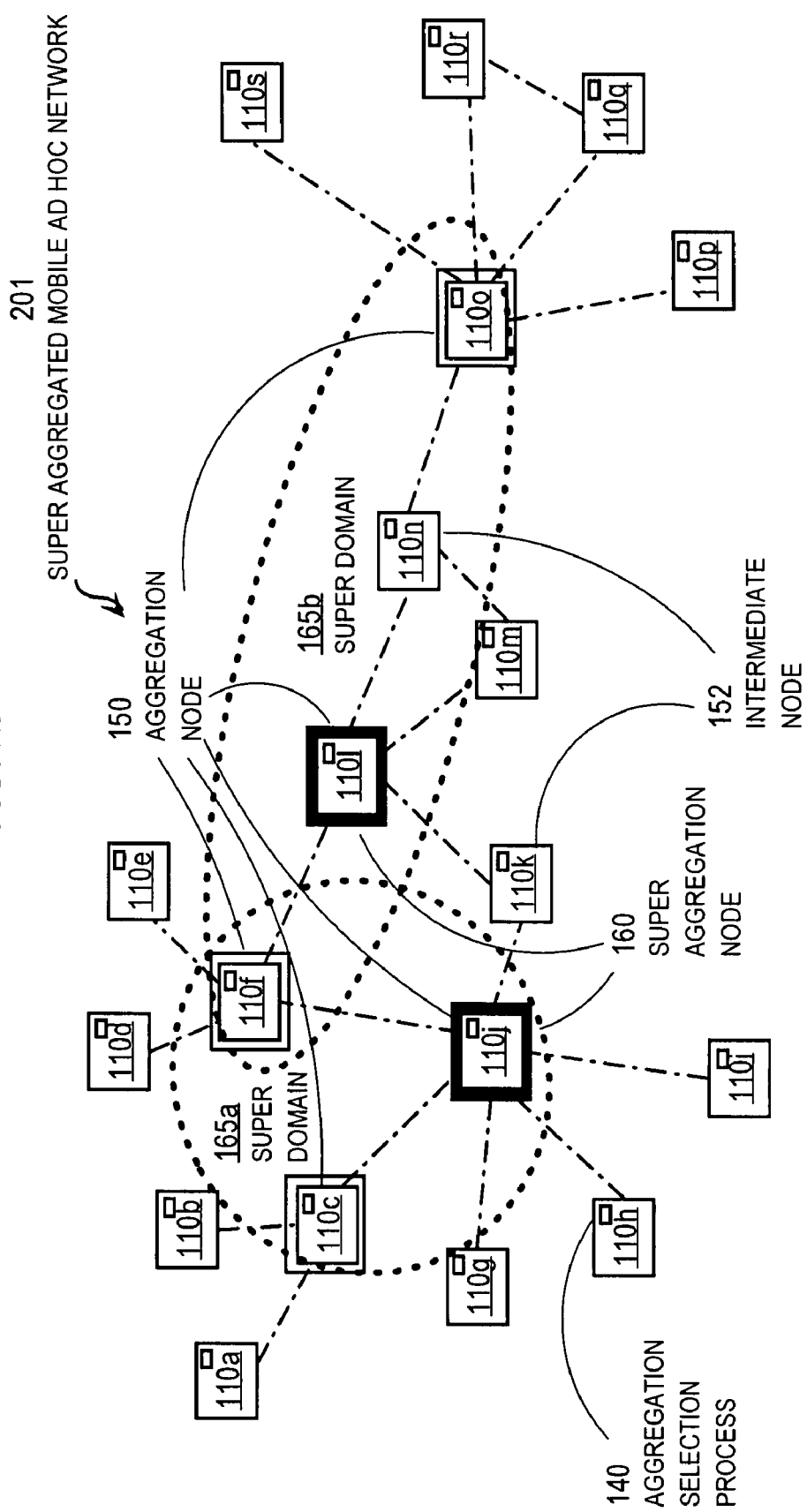
FIG. 2B illustrates an example aggregated MANET at a higher level of aggregation.

In some embodiments, higher levels of aggregation are also determined. FIG. 2B illustrates an example aggregated mobile ad hoc network 201 at a higher level of aggregation, called super aggregation herein. The nodes 110 and communication links 120 and aggregation selection process 140 are as in network 100 depicted in FIG. 1. The aggregation nodes 150 and selfish nodes (including intermediate nodes 152) are as in network 200 depicted in FIG. 2A. Network 201 includes super aggregation nodes 160 selected among the aggregation nodes 150. The aggregation selection process determines the super aggregation nodes 160 and the associated super domain 165a and super domain 165b, collectively referenced hereinafter as super domains 165. The super domains 165 are analogous to autonomous systems in OSPF.

The super aggregation nodes 160 and super domains are selected in the illustrated embodiment as described next. Aggregation node 110c determines it is in aggregated communication with only one other aggregation node, node 110j. Aggregated communication means direct communication or indirect communication (through an intermediate node) to another aggregation node without an intervening aggregation node. Aggregation node 110c also determines that node 110j is in aggregated communication with three aggregation nodes (aggregation node 110c, aggregation nodes 110f and aggregation node 110l through intermediate node 110k). Therefore, aggregation node 110c determines that node 110j is a super aggregation node 160 for information form aggregation node 110c. Similarly node 110j is a super aggregation node 160 for aggregation node 110f. As a result, super domain 165a includes one super aggregation node 110j and the two aggregation nodes, node 110c and node 110f.

Similarly, node 110*l* is a super aggregation node 160 for aggregation node 110*f* and aggregation node 110*o* in domain 165*b*. Thus, aggregation nodes 150 in super domains 165 are automatically and objectively determined.

Each aggregation node 150 passes, proactively, unsolicited aggregated information about the selfish nodes in its domain to a super aggregation node 160. Each super aggregation node 160 passes, proactively, unsolicited aggregated information about the aggregation nodes in its super domain to a super aggregation node 160 with which it is in aggregated communication. When a super aggregation node needs to route data to a super domain for a super aggregation node with which it is not in aggregated communication, then the super aggregation node requests routing information about the needed destination and intervening super aggregation nodes 160 pass, reactively, aggregated information from other super aggregation nodes 160 only upon a receiving a request from the remote super aggregation node soliciting such information.

The method allows wireless routers in mobile ad hoc networks to automatically determine their own super aggregation nodes and super domains for routing information and thus automatically pass proactive routing information to nearby domains, thus enabling routing protocols to further scale for many thousands of mobile wireless nodes.

3.0 Structural Overview

According to an illustrated embodiment, the connection information used to determine the aggregation nodes and super aggregation nodes is passed between aggregation selection processes 140 on neighboring nodes in modified routing protocol messages. In other embodiments, other messages are used to pass the connection information.

FIG. 3A illustrates an example hello message 300. A routing protocol hello message is sent by a router when a routing process on the router detects a new direct connection. In the illustrated embodiment, message 300 is a modified OSPF HELLO packet with an additional type-length-value (TLV) triplet for aggregation attributes in an aggregation attributes field. As is well known in the art, OSPF and other protocols allow optional data fields to be included as TLV fields. Each TLV field includes a type field 312, a length field 314 and a set of one or more values fields. In the illustrated embodiment, the routing protocol values fields include a node identifier (ID) field 316, and an aggregation status field 318 and an optional registered node ID field 319. Other fields, not shown, are included in various embodiments.

The type field 312 holds data that is unique for each different type of TLV field allowed in the protocol. For example, a value not in the current standard for OSPF would be used in the type field 312 and defined for aggregation attributes in a modified standard. The length field 314 holds data that indicates a number of octets (an octet is eight binary digits called bits) of the TLV field in total, including the size of type field 312 and length field 314. A process that receives the packet and does not recognize the value in type field 312 ignores the TLV field and can tell from the length field 314 how far to skip to find the next TLV field, if any.

Following the length field 314 is the data appropriate for the type indicated in the type field 312. An illustrated format includes a node ID field 316 and an aggregation status field 318.

The node ID field 316 holds data that uniquely indicates the node (e.g., node 110*a*) among all the nodes in the network (e.g., network 100). In some embodiments, the node ID is indicated by a Media Access Control (MAC) number or an Internet Protocol (IP) address included in a field that is a standard part of a header portion (not shown) that precedes the fields depicted in FIG. 3A, and field 316 is omitted.

The aggregation status field 318 holds data that indicates whether the node that sent the message 300 is an aggregation node. In an illustrated embodiment, the aggregation status field 318 holds data that indicates whether the node that sent message 300 is a selfish node, an intermediate selfish node, an aggregation node or a super aggregation node.

The registered node ID field 319 is included in some embodiments that avoid excessive status changes due to fast moving nodes, as described in more detail below with reference to step 494 of FIG. 4B. The registered node ID field holds data that indicates the node identifier of one or more nodes that caused the sending node, indicated in field 316, to have an aggregation status of an aggregation node. In some of these embodiments, when the aggregation status field 318 indicates the sending node is not an aggregation node, then field 319 is omitted.

FIG. 3B illustrates an example connection count message 320. A connection count message 320 is sent by a router when conditions change that warrant determining a new aggregation node, such as after receiving a hello message or when it is determined that a keep alive message has not been received in a timely way from a node formerly in direct communication. In the illustrated embodiment, message 320 is a modified OSPF packet with an additional type-length-value (TLV) triplet for connection attributes. In the illustrated embodiment, the TLV field includes a type field 322, a length field 324 and a set of one or more connection values fields. In the illustrated embodiment, the connections values fields include a connected count field 326, an aggregation status field 328, a connected node list field 329 and an aggregation list field 330. Other fields, not shown, are included in various embodiments.

The type field 322 holds data that is unique for each different type of TLV field allowed in the protocol. For example, a value not in the current standard for OSPF would be used in the type field 322 and defined for connection count attributes in a modified standard. The length field 324 holds data that indicates a number of octets of the TLV field in total, including the size of type field 322 and length field 324.

The connected count field 326 holds data that indicates the number of nodes in direct communication with the node that sent the connection count message 320. In some embodiments, the node that send the message 320 is indicated by a MAC number or an IP address included in a field that is a standard part of a header portion (not shown) that precedes the fields depicted in FIG. 3B. For example, a connection count message 320 sent by aggregation node 110*c* would include in field 326 data that indicates 3 nodes are in wireless communication with the sending node.

Like field 318, the aggregation status field 328 holds data that indicates whether the node that sent the message 320 is an aggregation node. In an illustrated embodiment, the aggregation status field 328 holds data that indicates whether the node that sent message 320 is a selfish node, an intermediate selfish node, an aggregation node or a super aggregation node. For example, a connection count message 320 sent by aggregation node 110*c* would include in field 328 data that indicates the sending node is an aggregation node.

The connected node list field 329 holds data that lists the node IDs of the nodes that are connected. In some embodiments only the selfish nodes are listed, because the aggregated nodes and super aggregation nodes are listed in other fields, described next. In some embodiments, field 329 is omitted.

The aggregation list field 330 holds data that indicates any aggregation nodes in aggregated communication with the sending node. In the illustrated embodiment, the aggregation list field includes an aggregation node count field 332, a connected aggregation nodes field 334 and a connected super aggregation nodes field 336.

The aggregation node count field 332 holds data that indicates the number of aggregated nodes in aggregated communication with the node that sent the connection count message 320. For example, a connection count message 320 sent by aggregation node 110*c* would include in field 332 data that indicates one aggregated node is in direct communication or indirect communication through an intermediate selfish node, without an intervening aggregated node, with the sending node. A connection count message 320 sent by aggregation node 110*j* would include in field 332 data that indicates three aggregated nodes are in direct communication or indirect communication through an intermediate selfish node, without an intervening aggregated node, with the sending node.

The connected aggregation nodes field 334 holds data that indicates the node ID of each aggregation node in aggregated communication with the node that sent the connection count message 320. For example, a connection count message 320 sent by aggregation node 110*c* would include in field 334 data that indicates the node ID of node 110*j*, the only node with which the sending node 110*c* is in aggregated communication. A connection count message 320 sent by aggregation node 110*j* would include in field 334 data that indicates the node ID of node 110*c*, node 110*f* and node 110*l*, the three nodes with which the sending node 110*j* is in aggregated communication. It is noted that aggregation node 110*j* is in aggregated communication with aggregation node 110*l* through intermediate node 110*k*.

The connected super aggregation nodes field 336 holds data that indicates the node ID of each super aggregated node in aggregated communication with the node that sent the connection count message 320. For example, a connection count message 320 sent by aggregation node 110*c* would include in field 334 data that indicates the node ID of node 110*j*, the super aggregation node with which the sending node 110*c* is in aggregated communication. A connection count message 320 sent by super aggregation node 110*j* would include in field 334 data that indicates the node ID of node 110*l*, the only super aggregation node with which the sending node 110*j* is in aggregated communication. It is noted that super aggregation node 110*j* is in aggregated communication with super aggregation node 110*l* through intermediate node 110*k*. In embodiments with only one level of aggregation, field 336 is omitted.

Figure 3C:
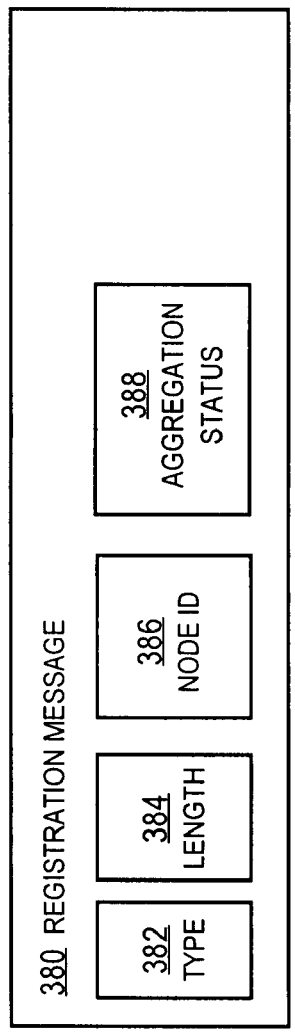
FIG. 3C illustrates an example aggregation registration message.

FIG. 3C illustrates an example aggregation registration message 300. The message 380 includes a type field 382, a length field 384, a node identifier (ID) field 386, and an aggregation status field 388. Other fields, not shown, are included in various embodiments.

The type field 382 holds data that is unique for each different type of TLV field allowed in the protocol. For example, a value not in the current standard for OSPF would be used in the type field 382 and defined for aggregation registration attributes in a modified standard. This type is used for the sending node to alert the receiving node that the receiving node is an aggregation node for information about the sending node.

The length field 384 holds data that indicates a number of octets; the node ID field 386 holds data that uniquely indicates the sending node; and the aggregation status field 388 holds data that indicates whether the node that sent the message 300 is a selfish node (or a selfish-intermediate node) or an aggregation node. In some embodiments, the node is identified by a MAC number or IP address in a preceding header (not shown) and the node ID field 386 is omitted.

Although fields in message 300 and message 320 and message 380 are depicted as contiguous blocks of data in a particular order for purposes of illustration, in other embodiments one or more fields or portions thereof are included in a different order or are omitted.

Figure 3D:
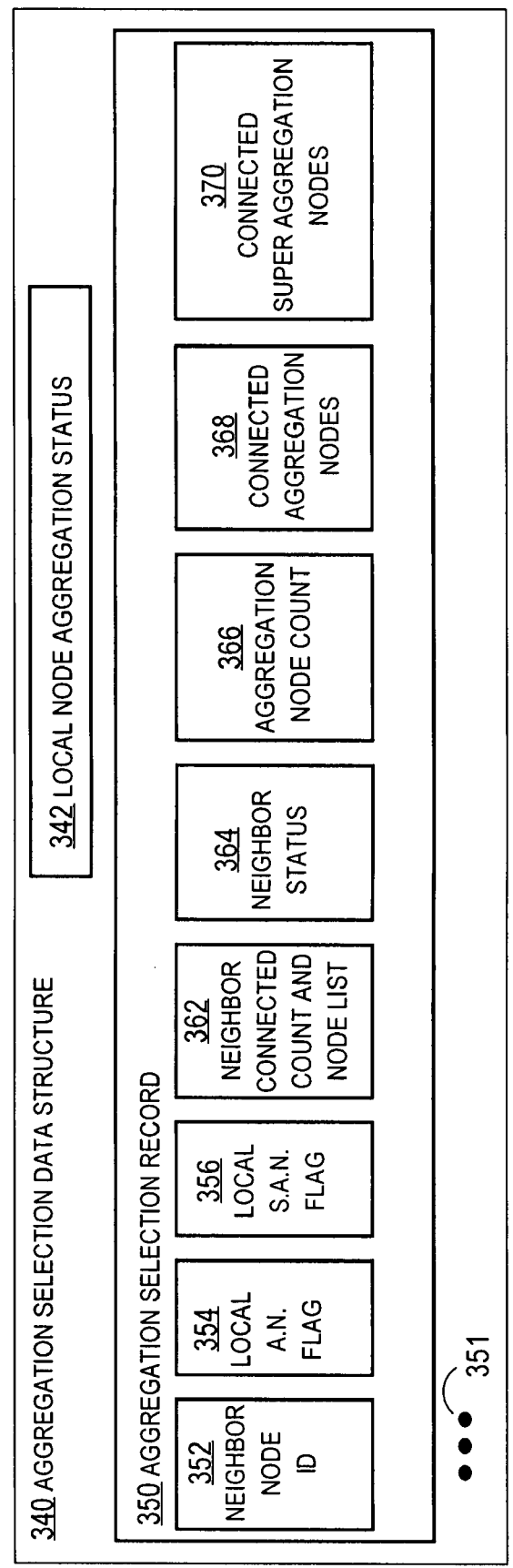
FIG. 3D illustrates an example aggregation selection data structure.

FIG. 3D illustrates an example aggregation selection data structure 340 on a network node, such as a router. In some embodiments in which the aggregation selection process is included in a routing protocol process, the aggregation selection data structure is included in a routing protocol data structure.

The aggregation selection data structure 340 is stored to be accessible to each node that includes the aggregation selection process 140. The aggregation selection data structure 340 includes a local node aggregation status field 342 and an aggregation selection record 350 for each neighbor with which the local network node has a direct communications link, such as a wireless link. The aggregation selection data structure includes an additional aggregation selection record, indicated by ellipsis 351, for each additional neighbor with which the local network node has a direct communications link.

The local node aggregation status field 342 holds data that indicates whether the local node is a selfish node, an intermediate selfish node, an aggregation node or a super aggregation node. The local node is an aggregation node if even one neighbor has selected the local node to be an aggregation node. The local node is a super aggregation node if even one aggregation node in aggregated communication with the local node has selected the local node as a super aggregation node. The aggregation status indicated in field 342 is indicated in field 318 of hello messages 300 sent by the local node and in field 328 of connection count messages 320 sent by the local node.

The aggregation selection record 350 includes a neighbor node ID field 352, a local aggregation node flag field 354, a local super aggregation node flag field 356, a neighbor connected count and list field 362, a neighbor status field 364, an aggregation node count field 366, a connected aggregation nodes field 368 and a connected super aggregation nodes field 370.

The neighbor node ID field 352 holds data that indicates a particular neighbor in direct communication with the local node.

The local aggregation node flag field 354 holds data that indicates whether the local node has been selected to be an aggregation node for that particular neighbor indicated in field 352. In some embodiments, the field 354 is a single bit that has a first value to indicate the local node is not an aggregation node for that neighbor and a second value to indicate the local node is an aggregation node for that neighbor.

The local super aggregation node flag field 356 holds data that indicates whether the local node has been selected to be a super aggregation node for that particular neighbor indicated in field 352. For the local node to be a super aggregation node, the particular neighbor should itself be an aggregation node. In some embodiments, the field 356 is a single bit that has a first value to indicate the local node is not a super aggregation node for that neighbor and a second value to indicate the local node is a super aggregation node for that neighbor. In embodiments with only one level of aggregations, field 356 is omitted. In some embodiments with additional higher levels of aggregation, additional flag fields are included.

The neighbor connected count field and list 362 holds data that indicates the number of nodes in direct communication with the particular neighbor indicated in field 352. For example, in the illustrated embodiments, the data in field 362 is based on data in field 326 received in a connection count message 320 from the neighbor indicated in field 352. In some embodiments in which connection count messages include field 329, the field 362 also lists the node IDs of the selfish nodes that are neighbors of the node indicated in field 352.

The neighbor status field 364 holds data that indicates the aggregation status of the particular neighbor indicated in field 352. For example, in the illustrated embodiments, the data in field 364 is based on data in field 328 received in a connection count message 320 from the neighbor indicated in field 352. In some embodiments, the data in field 362 is based on data in field 318 received in a hello message 300 from the neighbor indicated in field 352.

The aggregation node count field 366 holds data that indicates the aggregation node count at the particular neighbor indicated in field 352. For example, in the illustrated embodiments, the data in field 366 is based on data in field 332 received in a connection count message 320 from the neighbor indicated in field 352.

The connected aggregation nodes field 368 holds data that indicates the node IDs of aggregation nodes in aggregated communication with the particular neighbor indicated in field 352. For example, in the illustrated embodiments, the data in field 368 is based on data in field 334 received in a connection count message 320 from the neighbor indicated in field 352.

The connected super aggregation nodes field 370 holds data that indicates the node IDs of super aggregation nodes in aggregated communication with the particular neighbor indicated in field 352. For example, in the illustrated embodiments, the data in field 370 is based on data in field 336 received in a connection count message 320 from the neighbor indicated in field 352.

Although fields in data structure 340 are depicted as contiguous blocks of data in a single memory device in a particular order for purposes of illustration, in other embodiments one or more fields or portions thereof are included in a different order on one or more different memory devices, or are omitted.

4.0 Method

The automatic determination of aggregation nodes based on number of connected nodes is performed by the aggregation selection process 140 on each node 110 in a backbone of the network 100. In an illustrated embodiment, the nodes are wireless routers and the information aggregated is routing information and the aggregation selection process 140 is performed by a routing process on each wireless router.

Figure 4A:
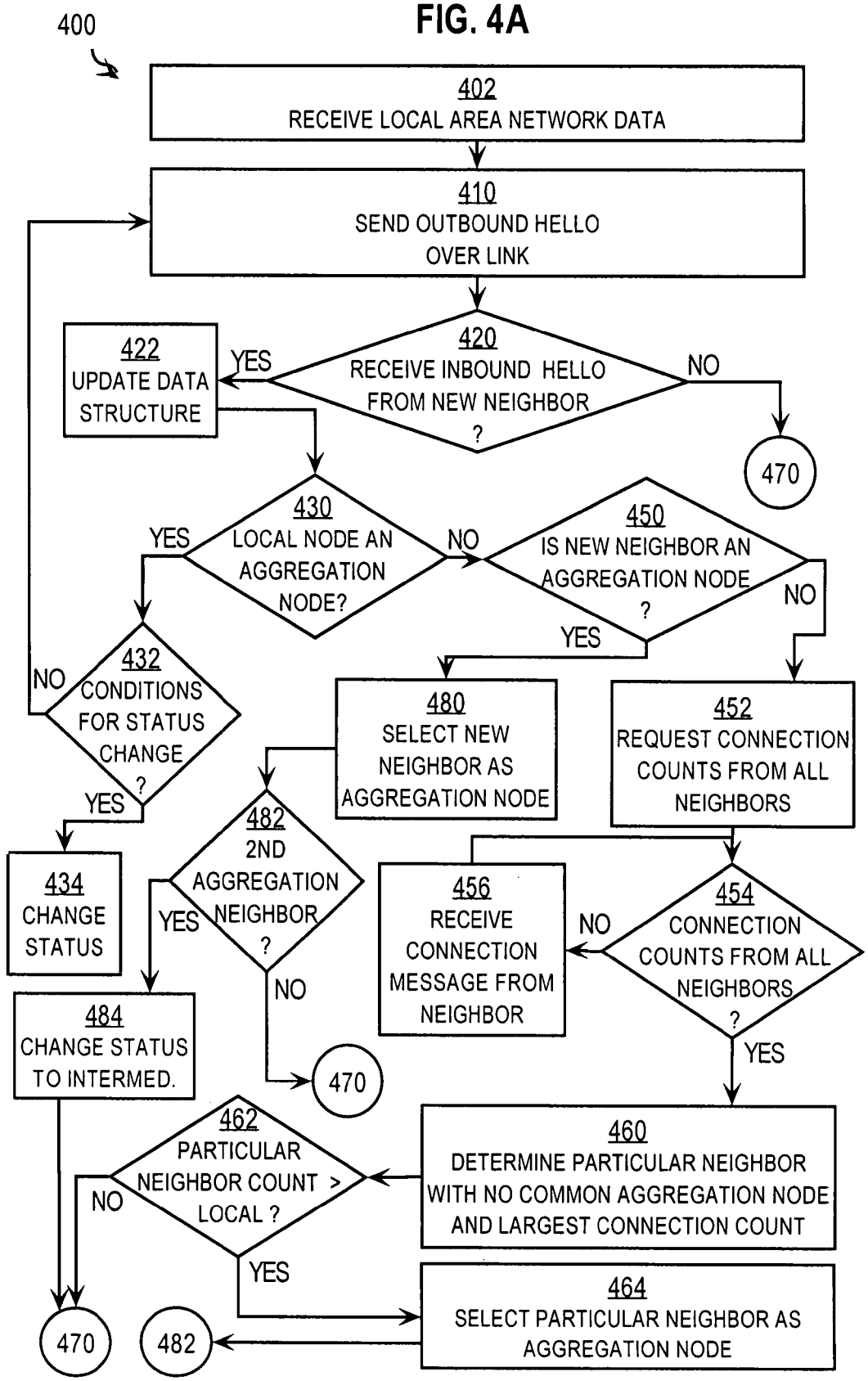
FIG. 4A and FIG. 4B illustrate at a high level an example method for determining aggregation of routing information performed at a router in an ad hoc mobile network.
Figure 4B:
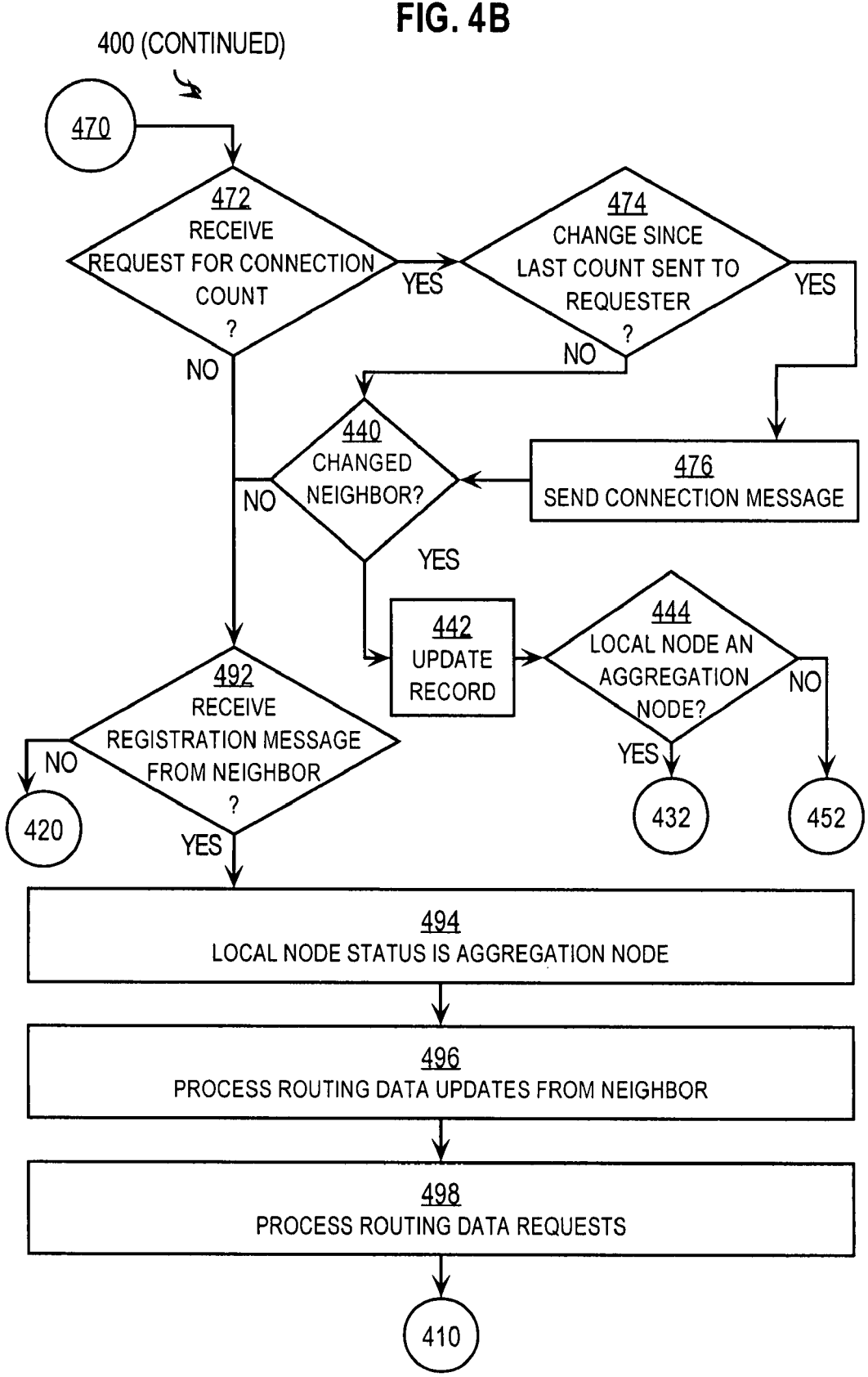
Figure 5A:
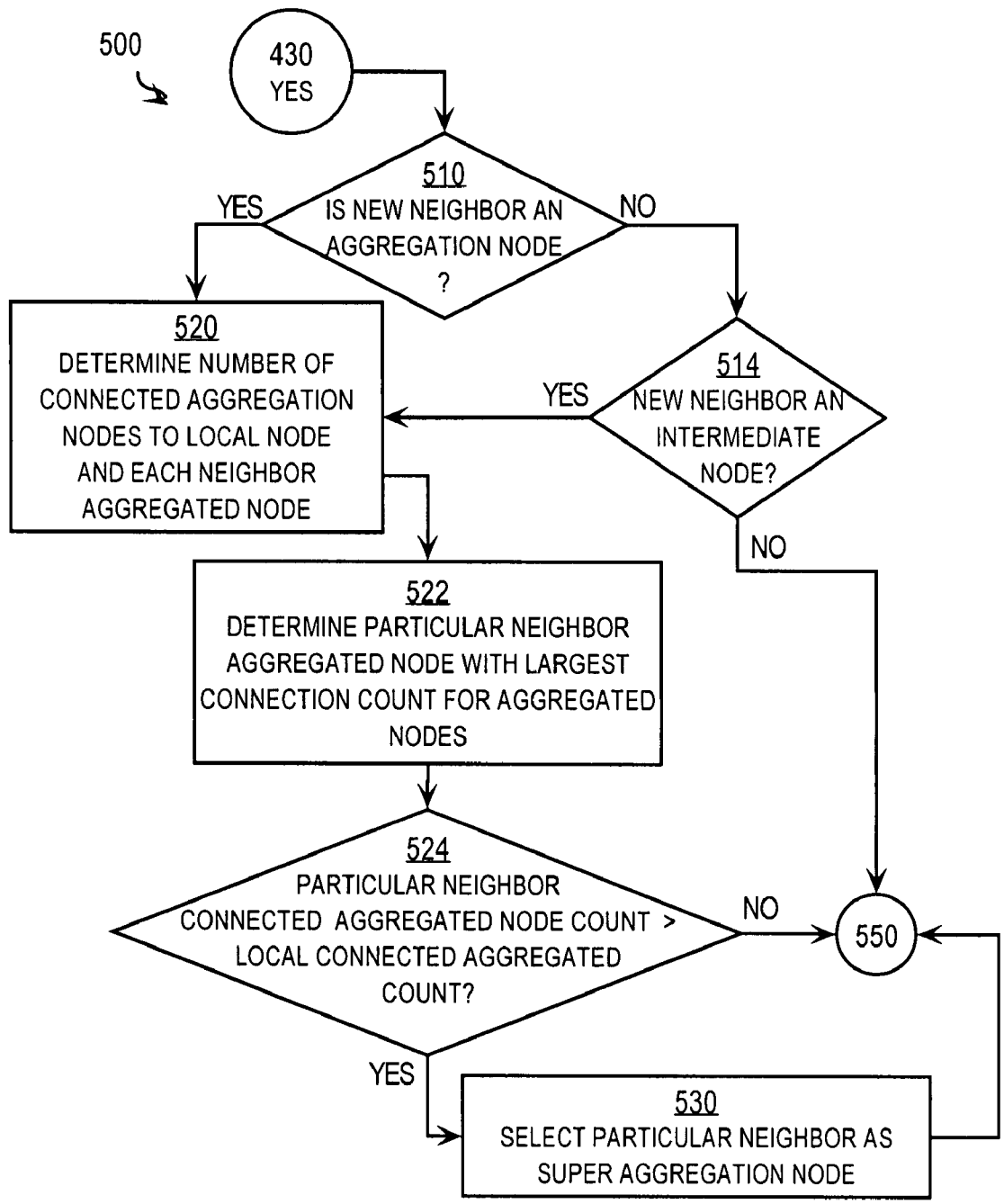
FIG. 5A and FIG. 5B and FIG. 5C illustrate a example method for performing steps in FIG. 4A for changing aggregation performed at a router in an ad hoc mobile network.
Figure 5B:
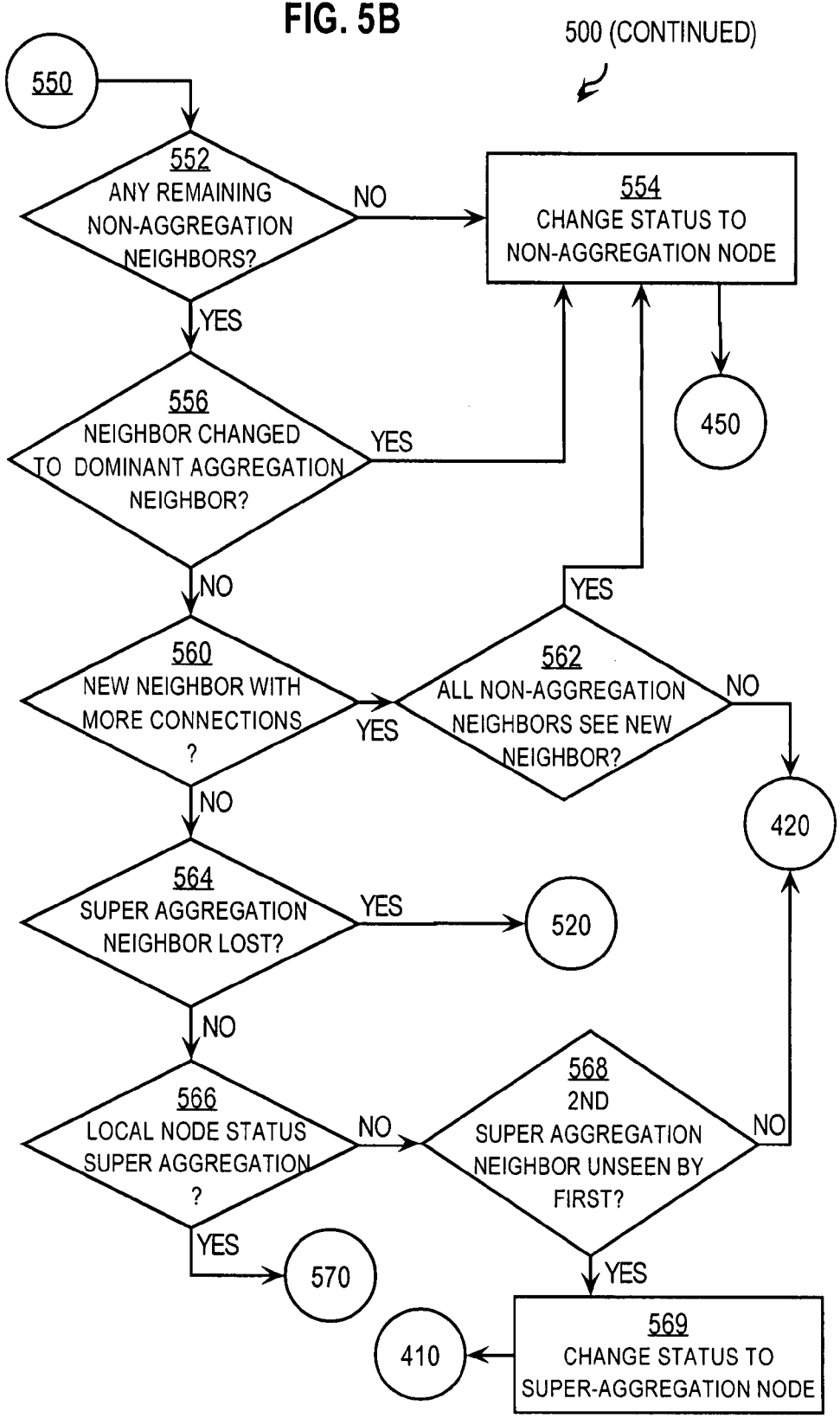
Figure 5C:
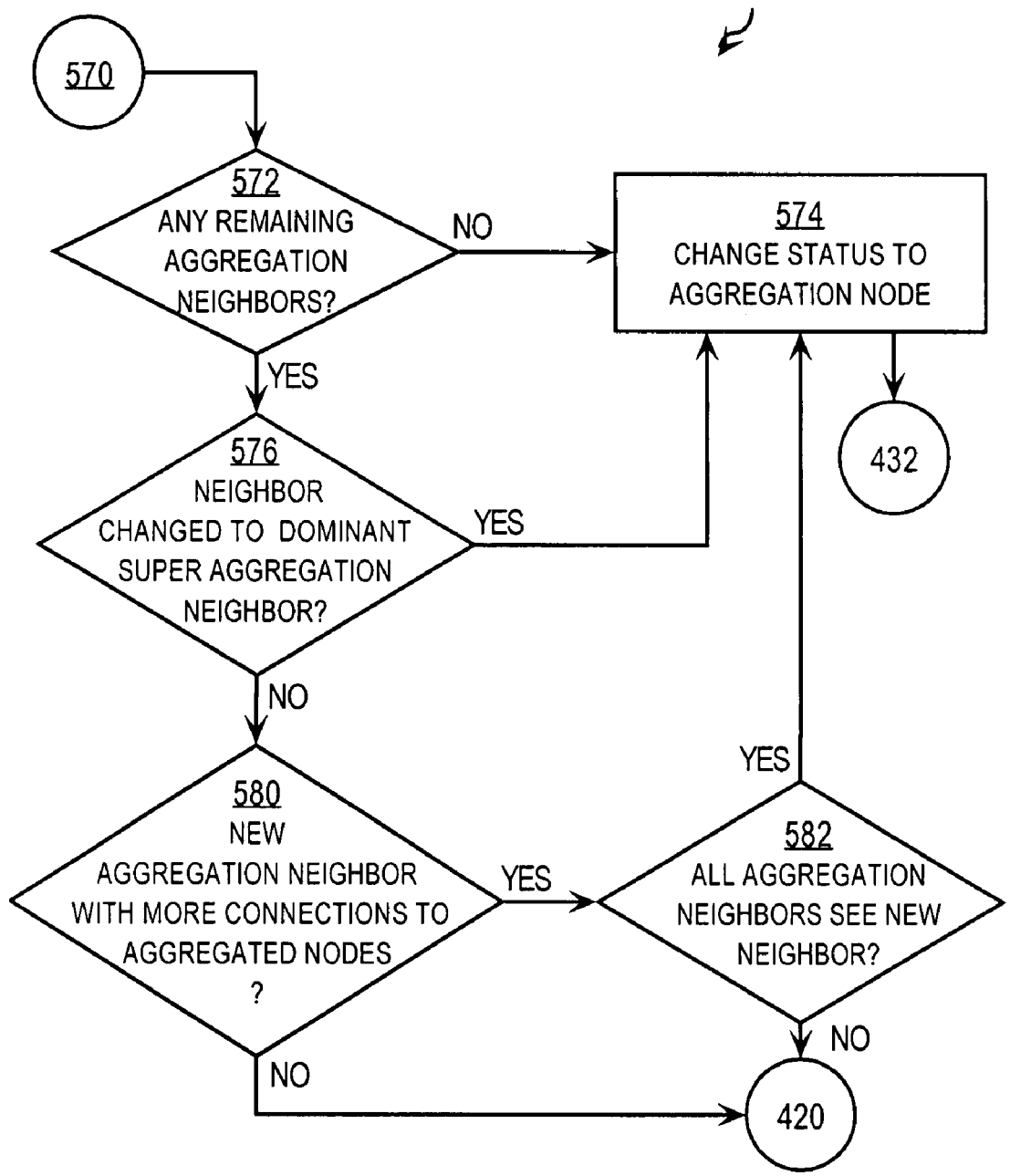

FIG. 4A and FIG. 4B illustrate at a high level an example method 400 for determining aggregation of routing information performed at a router in an ad hoc mobile network (MANET). In the illustrated embodiments, the method 400 is performed by aggregation selection process 140 in a routing process on wireless routers 110. Although steps in FIG. 4A and FIG. 4B and subsequent flow charts, FIG. 5A, FIG. 5B and FIG. 5C, are shown in a particular order for purposes of illustration, in other embodiments, one or more steps may be performed in a different order or overlapping in time, in series or in parallel, or one or more steps may be omitted or added, or changed in some combination of ways.

In step 402, the local router, e.g., router 110a, receives data about the local area network, e.g., LAN 112, connected to that node. For example, router 110a receives data that indicates the IP addresses of each end node, bridge and other router, if any, (not shown) connected to LAN 112. In other embodiments, step 402 is replaced by a step in which non-routing local information to be aggregated is received. Any method may be used to receive this data. For example, in various embodiments, the data is included as a default value in software instructions, is received as manual input from a network administrator on the local or a remote node, is retrieved from a local file or database, or is sent from a different node on the network, either in response to a query or unsolicited, or the data is received using some combination of these methods.

In step 410, the local node sends an outbound hello message over one or more network interfaces to its communication links. For example, when router 110a is powered up or while router 410a is out of contact with any other router, or when router 110a detects a wireless transmission from a new neighbor, router 110a transmits a hello message, such as routing protocol hello message 300 depicted in FIG. 3A. A hello message is normally sent on a periodical basis, e.g. every 10 seconds. In most routing protocol implementations hello messages are used to detect whether a peer is still reachable. There is usually a rule that specifies, if about 3 or 4 consecutive Hello messages are not received from a particular, then that particular peer is determined to be down. The hello message includes the node ID, such as the IP address, of the transmitting router and the aggregation status of the transmitting router. When a node first powers up, or first joins a network and has no neighbors at first, the node is a selfish node. For purposes of illustration, it is assumed that router 110a is a selfish node and includes in field 318 data that indicates the transmitting node, router 110a, is a selfish node.

Eventually, the transmitting node receives a hello message from another node, which is, by definition, a new neighbor. In step 420, it is determined whether the local router receives an inbound hello message from a new neighbor. If not, control passes to step 470 and subsequent steps, described below to process other message types received. If it is determined, in step 420, that the local router receives an inbound hello message from a new neighbor, control passes to step 422. In step 422, the local node updates the aggregation selection data structure 340 to include an aggregation selection record 350 for the new neighbor. The record 350 for the new neighbor includes storing in the neighbor node ID field 352, the neighbor node ID indicated in the node ID field 316 in the hello message 300 received from the new neighbor. The record 350 for the new neighbor includes storing in the neighbor status field 364, the neighbor node status indicated in the aggregation status field 318 in the hello message 300 received from the new neighbor. Control then passes to step 430.

For example, router 110a receives an inbound hello message over a wireless link 120 from router 110c. For purposes of illustration, it is assumed that router 110c is also a selfish node. In step 422, the local router 110a stores a new aggregation selection record 350 for the new neighbor, router 110c.

In step 430, it is determined whether the local node is an aggregation node. If so, then control passes to step 432. In step 432, it is determined whether conditions are satisfied for changing the status of the local node from aggregation node to selfish node or to super aggregation node. If not, then control passes back to step 410 to send out a hello message to a new neighbor announcing the local node is an aggregation node. If it is determined in step 432 that conditions are satisfied for changing the status of the local node from an aggregation node, then control passes to step 434 to make those changes. Some embodiments of step 432 and step 434 are described in more detail below with reference to FIG. 5A and FIG. 5B and FIG. 5C.

If it is determined, in step 430, that the local node is not an aggregation node, then control passes to step 450. For purposes of illustration, it is assumed that router 110a is a selfish node; and control passes to step 450.

In step 450, it is determined whether the status of the new neighbor indicates the new neighbor is already an aggregation node. If so, control passes to step 480.

In step 480, the new neighbor is selected as an aggregation node for the local node. In the illustrated embodiment, step 480 includes sending a registration message, such as message 380 depicted in FIG. 3C, to the selected aggregation node, informing the selected node that it is to aggregate the information, such as routing information, from the local node. Step 480 also includes sending the information to be aggregated by the selected node. For example, in some embodiments, step 480 includes sending a routing update message according to a routing protocol. Any routing protocol may be used. In the illustrated embodiment, a proactive routing protocol is used. Thus, step 480 includes sending to the first neighbor node a registration message that includes registration data that indicates the first neighbor node is the aggregation node for the local node; and sending to the first neighbor node, an update message that includes information about the local node. Control then passes to step 482.

In step 482, it is determined whether the new neighbor selected as an aggregation node for the local node is the second aggregation node neighbor for the local node. If not, then control passes to step 470 and following steps to process any other messages received from established neighbors, including any registration messages, as described in more detail below with reference to FIG. 4B. If it is determined, in step 482, that the new neighbor selected as an aggregation node for the local node is the second aggregation node neighbor for the local node, then control passes to step 484. In step 484 the status of the local node is changed from selfish node to intermediate selfish node (also called intermediate node in the herein), because the node is now connected to two aggregation nodes. Control then passes to step 470 and succeeding steps described below with reference to FIG. 4B.

If it is determined, in step 450, that the status of the new neighbor indicates the new neighbor is not already an aggregation node, then control passes to step 452 and following steps to determine a neighbor, if any, that should be selected as an aggregation node.

In step 452, the local node requests connection counts from all neighbors in order to select the most connected neighbor, if any, to select as an aggregation node for the local node. In the illustrated embodiment, the local node sends a connection count message 320. For example, router 110a sends a connection count message 320 to router 110c in which the connected count field holds data that indicates one connected neighbor, the aggregation status field 328 holds data that indicates a selfish node and an aggregation list field 330 that is empty. As described below in more detail with reference to step 472 and following steps, any neighbor receiving the connection count message, which has not previously responded, responds with a connection count message of its own. After step 452, control passes to step 454.

In step 454, the local node determines whether connection count messages have been received from all its neighbors. If not control passes to step 456 to receive a connection count message from a missing neighbor. Control passes back to step 454 (either directly, as shown, or indirectly responding to other messages received in steps 420 and 472 and step 492, for example). Steps 454 and 456 form a loop that continues until connection count messages are received from all neighbors of the local node. Control then passes to step 460. For example, when router 110c responds with a connection count message, control passes to step 460.

For purposes of illustration, it is assumed that router 110c is connected to router 110j but not yet connected to router 110b. It is further assumed, for purposes of illustration, that router 110j is an aggregation node but not yet a super aggregation node. Then router 110c responds with a connection count message 320 that indicates router 110c is a selfish node connected to two other nodes. The connection count message 320 from router 110c includes data in the aggregation list field 330 that indicates in field 332 that the sending router is connected to one aggregation node, and that indicates in field 334 the node ID for router 110j. Field 336 is empty. Control then passes to step 460.

In step 460, the neighbor with the largest connection count and without a common aggregation node shared with the local node is determined. If multiple neighbors without a common aggregation node are connected to the same number of nodes, a tie-breaking procedure is employed to select one in a deterministic way so that all nodes would make the same choice. In the illustrated embodiment, the tie-breaking procedure is to determine that the node having the lowest node ID is the particular node. Control then passes to step 462.

For example, router 110a determines that router 110c has more connections than any other neighbor, because there is no other neighbor. Router 110a also determines that router 110c does not share an aggregation node with router 110a, because router 110a has no aggregation node. Thus in step 460, router 110a determines router 110c is the particular neighbor.

In step 462, it is determined whether the particular neighbor determined in step 460 has a connection count greater than the connection count of the local node. If not, no node is selected as an aggregation node for the local node, and control passes to step 470, described below. If no particular node is found without a common aggregation node in step 460, then the test in step 462 also fails; and control passes to step 470 without selecting a new aggregation node for the local node.

If it is determined, in step 462, that the particular neighbor determined in step 460 has a connection count greater than the connection count of the local node, then control passes to step 464. In step 464, the particular neighbor is selected as an aggregation node for the local node, as done in step 480 for the new node. In the illustrated embodiment, step 464 includes sending a registration message, such as message 380 depicted in FIG. 3C, to the selected aggregation node, thus informing the selected node that it is to aggregate the information, such as routing information, from the local node. Step 464 also includes sending the information to be aggregated by the selected node. For example, in some embodiments, step 464 includes sending a routing update message according to a proactive routing protocol. Thus step 464 includes sending to the first neighbor node a register message that includes registration data that indicates the first neighbor node is the aggregation node for the local node; and sending to the first neighbor node, an update message that includes information about the local node. Control then passes to step 482, and following steps to determine whether the local node should change aggregation status to intermediate node.

For example, router 110a determines, in step 462, that neighbor router 110c is connected to more nodes (2) than is itself (1). Thus control passes to step 464 and the router 110a selects router 110c as the aggregation node for routing information on router 110a. Router 110a sends a registration message, such as registration message 380, to router 110c. router 110a also sends a routing update message to router 110c. In the preferred embodiment, router 110a sends the update proactively, without waiting for a request from router 110c.

If the test in step 462 or step 482 fails, or after step 484 that changes aggregation status of the local node to intermediate, then control passes to step 470, and subsequent steps depicted in FIG. 4B. The process continues in step 470 and control passes to step 472.

In step 472, it is determined whether the local node has received a request for connection counts from a neighbor. For example, it is determined whether a connection count message 320 is received from a neighbor. If not, control passes to step 492 and subsequent steps described in more detail below. However, if it is determined, in step 472, that the local node has received a request for connection counts from a neighbor, then control passes to step 474.

In step 474, it is determined whether there has been a change in the count or node ID of connected nodes or connected aggregation nodes or super aggregation nodes since the last connection count message 320 sent to the requesting node that sent the request received in step 472. If not, then control passes to step 440 described below, and another connection count message is not sent. Step 474 avoids loops that involve sending the same message back and forth between the same nodes. However, if it is determined, in step 474, that there has been a change in the connection information since the last connection count message 320 was sent to the requesting node, then control passes to step 476.

In step 476, a connection count message is sent to the node that sent the request for connection counts. For example, connection count message 320 is sent from the local node to the requesting node. Control then passes to step 440.

In step 440, it is determined whether there is any change in the aggregation status of a current neighbor, including whether any current neighbor is lost (as determined by an overdue keep-alive message) or whether any neighbor has changed status as a result of the connection count message or request received during step 472. If it is determined, in step 440, that there is no change in the aggregation status of a current neighbor, then control passes to step 492, described below. However, if it is determined in step 440, that there is a change in the aggregation status of a current neighbor, then control passes to step 442.

In step 442, the aggregation selection record for the changed neighbor is updated to reflect the change. Control then passes to step 444. In step 444, it is determined whether the local node is an aggregation node. If so, control passes back to step 432 to determine if the local node should change status as a result of the change in the neighbor status. If it is determined, in step 444, that the local node is not an aggregation node, then control passes back to step 452 to determine if the local node should select and register with a different aggregation node neighbor.

In step 492, it is determined whether the local node has received a registration message from a neighbor, whereby the local node is selected as an aggregation node (or super aggregation node) for the sending node. If not, the local node has not changed to an aggregation node (or super aggregation node) and control passes back to step 420 and following steps to await a new message from a neighbor.

If it is determined, in step 492, that the local node has received a registration message from a neighbor, whereby the local node is selected as an aggregation node (or super aggregation node) for the sending node, control passes to step 494.

In step 494, the local node aggregation status is changed to indicate the local node is an aggregated node. Control then passes to step 496. In some embodiments, step 494 includes updating the data in field 354 of the record 350 associated with the neighbor that sent the request; and updating the data in field 342, describing the status of the local node. For example, when router 110c receives a registration message from router 110a, router 110c changes aggregation status indicated in field 354 of the record associated with router 110a and in field 342 of data structure 340 from selfish node to aggregation node.

In step 496, the local node processes the information to be aggregated. For example, the local router processes the routing information sent in a routing update message, such as the IP addresses of nodes on a LAN connected to the router that sent the routing update message. Control then passes to step 498. In step 498, the local node processes any requests received for aggregated information, such as a request for routing information from a neighboring router. Or forwarding a data packet from another neighbor based on the routing information received from the first neighbor. Control then passes back to step 410 to announce the new status of the local node as an aggregation node in a new hello message.

Following the steps of method 400, a network that is initially in the arrangement depicted in FIG. 1, becomes the aggregated network 200 depicted in FIG. 2. Each aggregation node 150, e.g., node 110c, is connected to more other nodes (e.g., 3) than is any selfish node (1) connected to that aggregation node. Similarly, aggregation node 110f is connected to four nodes while its selfish node 110d and selfish node 110e are each connected to only one other node. Aggregation node 110j is connected to six nodes while its selfish node 110g, selfish node 110h, and selfish node 110i are each connected to only one other node and selfish node 110k is connected to only two other nodes.

Some selfish nodes, node 110k and node 110n are intermediate nodes, because each is connected to two different nodes that are aggregation nodes. Intermediate node 110k is connected to aggregation node 110j and aggregation node 110l. Intermediate node 110n is connected to aggregation node 110l and aggregation node 110o.

Aggregation nodes that are in aggregate communication select a super aggregation node, in some embodiments. Also, as nodes enter and leave wireless communication, a remaining node's role as an aggregation node might change. The transition from aggregation node back to a selfish node or selfish-intermediate node, or up to a super aggregation node and back, occur in steps 432 and 434, as mentioned above; and are described in more detail next with reference to FIG. 5A and FIG. 5B.

In some embodiments, step 494 includes additional steps to mitigate excessive changes in status back and forth between aggregation node and selfish node. Such excessive changes occur if a neighbor node remains a neighbor for only a short time before becoming the neighbor of a different node, as with fast moving nodes.

In one set of embodiments, a timer is used to prevent excessively rapid changes in aggregation status. In these embodiments, the local selfish node that receives the registration message from a registering node acknowledges the registration to the registering node and starts a timer. After the timer expires, the local selfish node determines whether the registering node is still in direct communication (e.g., the local node is still receiving hello messages from the registering node). If so, then the local selfish node changes its status to aggregation node and announces its status as aggregation node to its neighbors. If not, then the local selfish node does not change its status and does not announce that it is an aggregation node.

In some of these embodiments, before the timer expires, the local selfish node does aggregate the information received from the registering node and thus act as the gateway for the registering node to the network. In some embodiments, the duration of the timer is statically configured. In some embodiments, the duration of the timer is determined dynamically based on statistics of peering observed at the local node or the network. For example, in some embodiments, the timer is set to 1% of the average lifetime of peering relationships observed by the local node.

In another set of embodiments, a predictive algorithm is employed that takes into account the velocity of the registering node. In some of these embodiments, the registering node communicates its velocity information to the local selfish node. The local selfish node makes a prediction based on the velocity of the registering node and zero or more additional factors, such as the roughness of the local terrain, the observed signal to noise ratio of the received signal, and determines how long the registering node is likely to be in direct communication. If the predicted time of direct communication is below some threshold amount, then the local selfish node does not change its status and does not announce a change in status. In some of these embodiments, while the registering node is in direct communication, the local selfish node does aggregate the information received from the registering node and thus act as the gateway for the registering node to the network.

In another set of embodiments, the hello message 300 includes a registered node ID field 319 when the aggregation status field 318 indicates the sending node (indicated in field 316) is an aggregation node. The local selfish node that receives the hello message stores locally data that indicates the registered node that caused the sending node to be an aggregation node and the time of receiving the hello message. If the same registered node attempts to register with the local selfish node a short time later, then the registering node is recognized as a fast moving node that is not likely to stay in direct communication for long. The local node will set a timer, as described above, before changing its status to aggregation node for this fast moving registering node.

FIG. 5A and FIG. 5B and FIG. 5C illustrate a example method 500 for performing steps 432 and 434 in FIG. 4A for changing aggregation at a node, such as a router in an ad hoc mobile network (MANET). Thus method 500 is a particular embodiment of steps 432 and 434. Control passes to step 510 from the yes branch out from step 430. Thus control passes to step 510 when the local node is an aggregation node.

In step 510, it is determined whether a new neighbor is an aggregation node. If so, it is possible that the local node will select the new neighbor as a super aggregation node and control passes to step 520 and following steps, described below, to determine whether to make that selection.

If it is determined, in step 510, that the new neighbor is not an aggregation node, then control passes to step 514. In step 514, it is determined whether a new neighbor is an intermediate selfish node. If so, then it might provide aggregated communication to a new aggregation node, and control passes to step 520 and following to determine whether that new aggregation node should be selected as a super aggregation node.

If it is determined, in step 514, that the new neighbor is not an intermediate node, then control passes to step 550 and following steps, described below with reference to FIG. 5B, to determine whether conditions are satisfied to change the current aggregation status.

If it is determined, in step 510, that the new neighbor is an aggregation node, or if it is determined, in step 514, that the new neighbor is an intermediate node, then control passes to step 520.

In step 520, the number of aggregation nodes in aggregate communication with the local node and the number of aggregation nodes in aggregate communication with each of its aggregation neighbors is determined. For example, in some embodiment, the local node requests a connection count from each of its neighbors and waits for a reply, as described above for steps 452 through 456. In some embodiment, the local node requests a connection count from each of its aggregation and intermediate neighbors and waits for a reply. In some embodiments, the local node requests a connection count only from the new node and relies on data already stored in the aggregation selection data structure for the other neighbors, if any. In this embodiment, after receiving the connection count message from the new neighbor, control passes to step 522.

In step 522, all aggregation neighbors (determined from data indicating aggregation or super aggregation in field 364 of the aggregation selection data structure 340) are examined to find the particular aggregation node that is in aggregated communication with the largest number of aggregation nodes. The number of aggregation nodes an aggregation neighbor is connected to is indicated by data in field 366 in the aggregation selection data structure 340 for neighbors. In some embodiments, a function of an intermediate selfish Node is to bridge communication between Aggregation Nodes as though they are connected directly. So if an intermediate node is in between two aggregation nodes that can not see each other (e.g., intermediate node 110*k* between aggregation nodes 110*j* and 110*l*), the intermediate node relays all the control messages between them. So the two aggregation nodes receive each other's hello and connection count messages. As described in step 460, the same deterministic tie-breaking procedure is used by all nodes to select one of several aggregation neighbors that are in aggregated communication with the same number of nodes. In the illustrated embodiment, the tie-breaking procedure is to select the aggregation node with the smallest node ID value.

In step 524, it is determined whether the aggregation node count of the particular neighbor determined in step 522 is greater than the aggregation node count of the local node determined in step 520. If not, then the particular aggregation neighbor is not a super aggregation node for the local node, and control passes to step 550, described below.

If it is determined, in step 524, that the aggregation node count of the particular neighbor is greater than the aggregation node count of the local node, then control passes to step 530.

In step 530 the particular neighbor is selected as a super aggregation node for the local node. In the illustrated embodiment, step 530 includes sending a registration message, such as message 380 depicted in FIG. 3C, to the selected aggregation node, informing the selected node that it is to aggregate the aggregated information, such as aggregated routing information, from the local node. The difference between an aggregation registration message 380 and a super aggregation registration message can be indicated in any way. In an illustrated embodiment, if the aggregation status data in field 318 indicates the sending node is a selfish or intermediate node, then the registration is an aggregation registration; and if the aggregation status data in field 318 indicates the sending node is an aggregation node, then the registration is a super aggregation registration. In some embodiments, a different value in the type field 312 is used to distinguish an aggregation registration message from a super aggregation registration message.

In the illustrated embodiment, step 530 also includes sending the aggregated information to be aggregated further by the selected node. For example, in some embodiments, step 530 includes sending a level 3 routing update message according to a proactive level 3 routing protocol. Any routing protocol may be used in other embodiments. Thus step 530 includes sending to the first neighbor node a registration message that includes registration data that indicates the first neighbor node is the super aggregation node for the local node; and sending to the first neighbor node, an update message that includes information about the local node. Control then passes to step 550, and following steps to determine whether the local node should change aggregation status.

If the test in step 514 or step 524 fails, or after step 530 that selects a neighbor as a super aggregation node, then control passes to step 550, and subsequent steps depicted in FIG. 5B. The process continues in step 550 and control passes to step 552.

In step 552, it is determined whether there are any remaining non-aggregation neighbors for the local node, which, it is to be recalled is an aggregation node when step 552 receives control. For example, in some embodiments, during step 552, any neighbors that are not active, by virtue of an overdue keep alive message or 3 consecutive missing hello messages, have the aggregation selection record 350 associated with that neighbor removed. It is then determined whether the local node is connected to any neighbors with an aggregation status of selfish or intermediate. If not, then the local node can no longer be an aggregation node and control passes to step 554. In step 554, the local node changes its status to non-aggregation node. For example, the data in the local node aggregation status field 342 is changed to indicate a selfish node if the local node is a neighbor of no nodes or of one aggregation node and is changed to indicate an intermediate node if the local node is a neighbor of two or more aggregation nodes. Control then passes to step 450 to determine what neighbor, if any, should be an aggregation node for the local node. In some embodiments, control passes back to step 410 to cover a possible scenario in which the local node loses all peering altogether.

If it is determined, in step 552, that there are remaining non-aggregation neighbors for the local node, then control passes to step 556. In step 556 it is determined whether a neighbor has changed to a dominant aggregation neighbor of the local aggregation node. An aggregation node neighbor is a dominant aggregation neighbor of the local aggregation node if the following conditions apply: 1] the local aggregation node is not in aggregate communication with any other aggregation node; 2] every selfish node neighbor of the local aggregation node listed in the aggregation selection data structure 340 is an intermediate selfish node (indicated by data in field 364 of the record for the selfish node neighbor) that lists the aggregation node neighbor as a connected aggregation node (as indicated by data in field 368 or field 370 of the record for the selfish node neighbor); and 3] the aggregation node neighbor is connected to more nodes (as indicated by data in field 362 of the record for the aggregation node neighbor) than the local aggregation node is connected to.

If it is determined in step 556 that a neighbor has changed to a dominant aggregation neighbor of the local aggregation node, then the local node reverts to a selfish node. Control passes to step 554 and following steps, described above, whereby the local node changes status to non-intermediate selfish node and registers with the dominant aggregation neighbor.

It is assumed for purpose of illustrating step 556 that a MANET is arranged as depicted in FIG. 6A. FIG. 6A, FIG. 6B, FIG. 6C and FIG. 6D illustrate an example aggregated network at an initial time and at three successively later times. In FIG. 6A, a aggregated MANET 601 at an initial time includes four nodes, node 610a, node 610b, node 610c and node 610d. Each node includes an aggregation selection process 140, and each node is in wireless communication with every other node as illustrated by links 120. It is further assumed that node 610b is selected as aggregation node 650 for the aggregated MANET 601 (for example, because node 610b has the smallest node ID). The other nodes are selfish nodes. In FIG. 6B, an aggregated MANET 602 at a first successive time after the initial time includes the four nodes of MANET 601 plus new node 610e and new node 610f. The group of nodes that includes node 610a, node 610b, node 610c, node 610d, node 610e and node 610f are collectively called hereinafter nodes 610.

In FIG. 6C, an aggregated MANET 603 at a second successive time after the first successive time includes nodes 610. The new nodes, node 610e and node 610f each independently select node 610d as an aggregation node 650, changing the status of node 610d to an aggregation node. Node 610d announces its selection as an aggregation node in a hello message or in a response to a connection count request. The formerly selfish nodes node 610a and node 610c change their status to intermediate selfish nodes. The intermediate selfish nodes 610a and 610c select node 610d as a second aggregation node and inform the original aggregation node 610b of this change in their status during one or more hello messages or connection count messages.

Former aggregation node 610b determines that node 610d is a dominant aggregation node. Former aggregation node 610b is not in communication with any other aggregation node but the new aggregation neighbor 610d, thus satisfying condition 1]. Every selfish node neighbor of the aggregation node 610b (e.g., node 610a and node 610c) is an intermediate selfish node that lists the aggregation node neighbor node 610d as a connected aggregation node. The aggregation node neighbor, node 610d, is connected to more nodes (5) than the former aggregation node is connected to (3). Thus, during step 556, node 610b determines that node 610d is a dominant aggregation node and passes control to step 554 to change the aggregation status of node 610b to selfish node. New selfish node 610b registers with dominant aggregation node 610d. When the intermediate selfish nodes 610a and 610c lose aggregation node 610b, they each change their aggregation status from intermediate node to simple selfish node. The result is the aggregated MANET 604 depicted in FIG. 6D, with all nodes 610 selecting node 610d as the only aggregation node 650.

Referring again to FIG. 5B, if it is determined in step 556 that a neighbor has not changed to a dominant aggregation neighbor of the local aggregation node, then control passes to step 560. In step 560, it is determined whether a new selfish neighbor has more connections than the local aggregation node. If so, then control passes to step 562.

In step 562, it is determined whether all the selfish neighbors of the local node are connected to the new neighbor. If so, then the aggregation node loses its status as an aggregation node and reverts to a selfish node; and control passes to step 554 and following steps to change status and determine what neighbor becomes the aggregation node for the local node. If not, then control passes to step 420 and following steps to retain status as an aggregation node and deal with the next message from a neighbor.

Any method may be used in step 562 to determine whether the selfish neighbors are connected to the new neighbor. In some embodiments, the determination is based on the data in the aggregation selection data structure 340 by including field 329 in the connection count messages and the list of node IDs for selfish nodes in field 362 of the aggregation selection record 350. In some embodiments, a connection count request is first sent to all selfish neighbors to send connection count messages, e.g., messages 320. The aggregation selection data structure 340 is updated with the data in the received connection count messages 320; and then the determination is made. In some embodiments that do not use field 329, a special query message is sent of the form of hello message 300, with a new value in the type field and the node ID of the new selfish neighbor, and all other selfish neighbors respond to the query with a message that indicates yes or no It is assumed for purpose of illustrating step 562 that a MANET is arranged as depicted in FIG. 7A. FIG. 7A, FIG. 7B, FIG. 7C and FIG. 7D illustrate a different example aggregated network at an initial time and at three successively later times. In FIG. 7A, a aggregated MANET 701a at an initial time includes three nodes, node 710a, node 710b and node 710c. A nearby aggregated MANET 701b, out of wireless communication range at an initial time, includes three nodes, node 710d, node 710e and node 710f. The nodes of MANET 701a and MANET 701b are collectively referenced hereinafter as nodes 710. Each node 710 includes an aggregation selection process 140, and each node is in wireless communication with other nodes as illustrated by links 120. It is further assumed that node 710b is selected as aggregation node 750 for the aggregated MANET 701a (for example, because node 710b has the smallest node ID in MANET 701a). It is further assumed that node 710f is selected as aggregation node 750 for the aggregated MANET 701b. The other nodes 710 are selfish nodes.

In FIG. 7B, an aggregated MANET 702 at a first successive time after the initial time includes the nodes 710 of MANET 701a and MANET 701b, because selfish node 710d of MANET 701b has come into wireless range of all three nodes in MANET 701a. During step 560, aggregation node 710b determines that new selfish neighbor 710d has more connections (5) than node 710b has (3); and control passes to step 562. During step 562, aggregation node 710b determines that both its selfish neighbors, node 710a and node 710c are also connected to the new neighbor 710d with more connections; therefore control passes to step 554 to change the aggregation status of node 710b to a selfish node. The selfish nodes 710a, 710b and 710c then select node 710d with 5 connections as the aggregation node for all three nodes formerly in MANET 701a.

In FIG. 7C, an aggregated MANET 703 at a second successive time after the first successive time includes nodes 710 with node 710d as an aggregation node 750 and former aggregation node 710b as a selfish node. Selfish node 710e is now connected to two different aggregation nodes, and changes its aggregation status to a selfish intermediate node and registers with the new aggregation node 710d. Node 710d is a dominant aggregation neighbor of aggregation node 710f. During step 556 on node 710f, aggregation node 710f determines that node 710d is a dominant aggregation neighbor, and node 710f reverts to a selfish node in step 554 and registers with node 710d as its aggregation node. When node 710f reverts to a selfish node, the node 710e detects the change and reverts to a simple selfish node that is not an intermediate node. The result is shown in FIG. 7D; an aggregated MANET 704 at a third successive time after the second successive time. MANET 704 includes nodes 710 with node 710d as an aggregation node 750 and former aggregation node 710f as a selfish node.

Figure 8C:
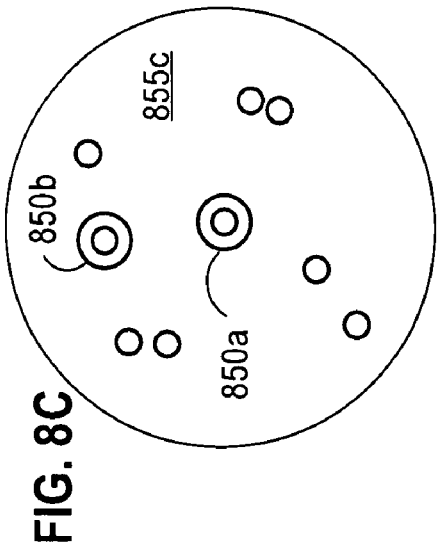
FIG. 8A, FIG. 8B, FIG. 8C and FIG. 8D illustrate another different aggregated network at an initial time and at three successively later times.
Figure 8D:
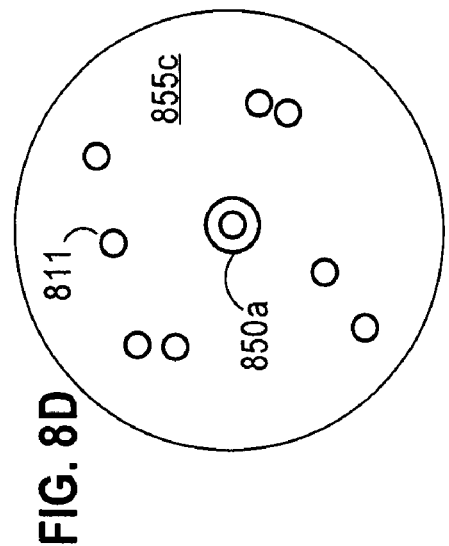
Figure 8B:
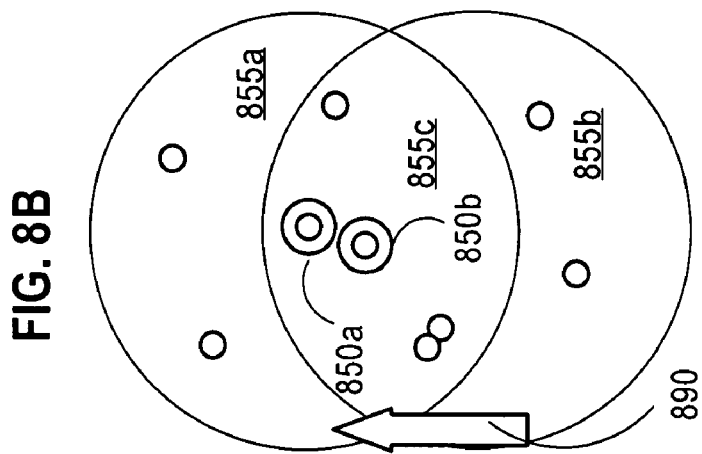
Figure 8A:
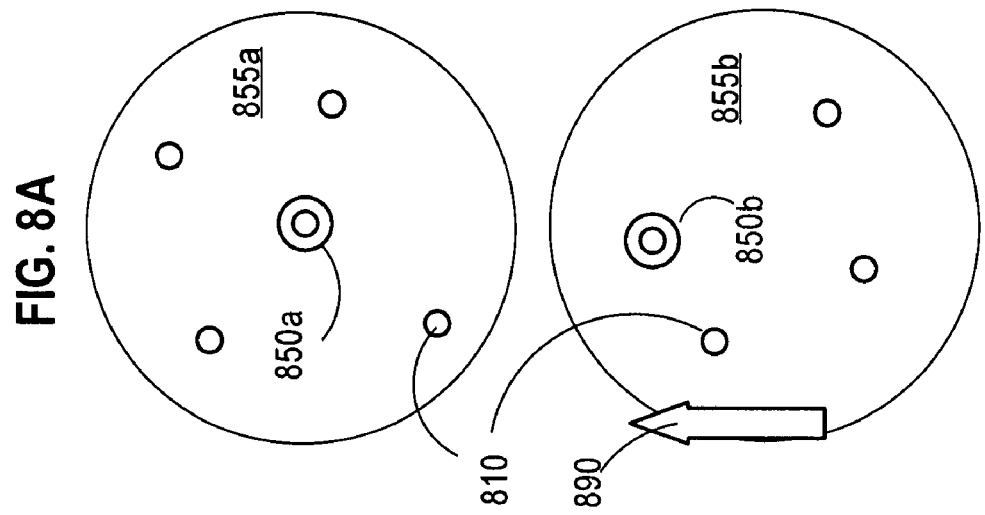

It is also assumed for purpose of illustration that a MANET is arranged as depicted in FIG. 8A. FIG. 8A, FIG. 8B, FIG. 8C and FIG. 8D illustrate another different aggregated network at an initial time and at three successively later times. In FIG. 8A, an aggregated MANET at an initial time includes multiple selfish nodes 810 in wireless range of one aggregation node 850a; thus forming an aggregation domain 855a. A nearby aggregated MANET, out of wireless communication range at an initial time, includes multiple selfish nodes 810 in wireless range of one aggregation node 850b; thus forming an aggregation domain 855b. Each node includes an aggregation selection process (not shown); and each node is in wireless communication with one or more other nodes in its aggregation domain via wireless links (not shown). Nodes in domain 855b are moving toward domain 855a as indicated by arrow 890.

In FIG. 8B, an aggregated MANET at a first successive time after the initial time includes overlapping domain 855a and domain 855b. In an area of overlap 855c, each selfish node is in wireless communication with both aggregation node 850a and aggregation node 850b. Thus every selfish node in overlap area 855c attains an aggregation status of an intermediate node.

In FIG. 8C, an aggregated MANET at a second successive time after the first successive time includes completely overlapping domain 855a and domain 855b in an area of overlap 855c. Each selfish node is in wireless communication with both aggregation node 850a and aggregation node 850b. Thus every selfish node attains an aggregation status as an intermediate node. The first aggregation node to have all its selfish nodes become intermediate selfish nodes recognizes the other aggregation node as a dominant aggregation node during step 556. That first aggregation node loses its aggregation status as an aggregation node and reverts to a selfish node during step 554. That newly reverted selfish node registers with the dominant aggregation node. If both aggregation nodes revert to selfish nodes, then this is detected during step 440 and both nodes negotiate to a new aggregation node based on the node with the most connections during step 452 and following steps.

The result is shown in FIG. 8D, which depicts an aggregated MANET at a third successive time after the second successive time having a single domain 855c comprising the overlap area. One of the original aggregation nodes, node 850a, retains its aggregation status as an aggregation node. The other aggregation node reverts to selfish node 811.

Referring again to FIG. 5B, if it is determined, in step 560, that a new selfish neighbor does not have more connections than the local aggregation node, then control passes to step 564. In step 564, it is determined whether a super aggregation neighbor is lost. If so, control passes to step 520 and following steps to determine whether another aggregation node is to be selected as a super aggregation node.

If it is determined, in step 564, that a super aggregation neighbor is not lost, then control passes to step 566. In step 566, it is determined whether the local node is a super aggregation node. If so, control passes to step 570 and following steps, described below with reference to FIG. 5C, to determine whether the local node should lose its status as a super aggregation node. Any method may be used to determine whether the local node is a super aggregation node. In the illustrated embodiment, the determination is made based on the status stored in the local node aggregation status field 342 in the aggregation selection data structure.

If it is determined, in step 566, that the local node is not a super aggregation node, then control passes to step 568. In step 568, the local node determines whether it is in aggregated communication (directly, or indirectly though one intermediate node) with two or more different super aggregation nodes that are not in aggregated communication with each other. If not, then the local node is not necessarily a super aggregation node, and control passes to step 420 and following steps to process the next message received from a neighbor node.

If it is determined, in step 568, that the local node is in aggregated communication with two or more different super aggregation nodes that are not in aggregated communication with each other, then control passes to step 569. In step 569, the local node changes its aggregation status to indicate it is a super aggregation node. Step 569 includes updating field 342 in the aggregation selection data structure 340. Control then passes to step 410 to send a hello message to all its neighbors, indicating that it is a super aggregation node.

It is assumed for purpose of illustrating step 568 that a MANET is arranged as depicted in FIG. 9A. FIG. 9A, FIG. 9B, FIG. 9C and FIG. 9D illustrate an example super aggregated network at an initial time and at three successively later times. In FIG. 9A, a super aggregated MANET 901*a* at an initial time includes four aggregation nodes, node 910*a*, node 910*b*, node 910*c* and node 910*d*, and multiple selfish nodes (not shown). A nearby super aggregated MANET 901*b*, out of aggregated communication range at an initial time, includes three aggregation nodes, node 910*e*, node 910*f* and node 9710*g* and multiple selfish nodes (not shown). The aggregation nodes of MANET 901*a* and MANET 901*b* are collectively referenced hereinafter as aggregation nodes 910. Each aggregation node 910 includes an aggregation selection process 140, and each node is in aggregated communication with other aggregation nodes as illustrated by aggregated communication links 920 (direct or indirect through an intermediate selfish node). It is further assumed that aggregation node 910*b* is selected as super aggregation node 960 for the super aggregated MANET 901*a* (for example, because node 910*b* has the smallest node ID of aggregated nodes in MANET 901*a*). It is further assumed that aggregation node 910*g* is selected as super aggregation node 960 for the super aggregated MANET 901*b*.

In FIG. 9B, a super aggregated MANET 902 at a first successive time after the initial time includes the aggregation nodes 910 and selfish nodes (not shown) of MANET 901*a* and MANET 901*b*, because super aggregation node 910*g* of MANET 901*b* has come into aggregated communication range of aggregation node 910*d* in MANET 901*a*. During step 568, aggregation node 910*d* determines that it is aggregated communication with both super aggregation node 910*b* and super aggregation node 910*g* and that the super aggregation node 910*b* and 910*g* are not in aggregated communication with each other. Thus, aggregation node 910*d* determines to change its status to super aggregation node, and to announce this change of status to all the aggregation nodes with which it is in aggregated communication (e.g., aggregation node 910*a*, aggregation node 910*c*, super aggregation node 910*b* and super aggregation node 910*g*). In FIG. 9C, a super aggregated MANET 903 at a second successive time after the first successive time includes nodes 910 as in FIG. 9B, but with the change that node 910*d* is now also a super aggregation node 960. Control then passes to step 410 to announce the new status and then to step 420 and following steps to process the next message received from a neighbor node.

If it is determined, in step 566, that the local node is a super aggregation node, then control passes to step 570 and following steps depicted in FIG. 5C. Control passes from step 570 to step 572.

In step 572, it is determined whether any aggregation nodes remain in aggregated communication with the super aggregation local node. If not, then the local node should no longer be a super aggregation node, and control passes to step 574 to change aggregation status from super aggregation node to aggregation node. Control then passes to step 432 and following to determine whether conditions are satisfied for further changes to aggregation status.

If it is determined, in step 572, that at least one aggregation nodes remains in aggregated communication with the super aggregation local node, then control passes to step 576. In step 576, it is determined whether any aggregation node in aggregated communication with the local super aggregation node has changed to a dominant super aggregation node.

A particular super aggregation node in aggregated communication with the local super aggregation node is a dominant super aggregation node if the following conditions apply: 1] every aggregation node in aggregated communication with the local super aggregation node (e.g., listed in the aggregation selection data structure 340) is an aggregation node also in aggregated communication with the particular super aggregation node (as indicated by the node ID of the particular super aggregation node included in field 370 of the record for the aggregation node neighbor); and 2] the particular super aggregation node is in aggregated communication with more aggregation nodes (as indicated by data in field 366 of the record for the particular super aggregation node) than the number of aggregated nodes the local super aggregation node is connected to.

If it is determined in step 576 that any aggregation node in aggregated communication with the local super aggregation node has changed to a dominant super aggregation node, then control passes to step 574 to change the aggregation status of the local node from super aggregation node to aggregation node. Control then passes to step 432 and following to determine whether conditions are satisfied for further changes to aggregation status.

For example, in the super aggregated MANET 903 of FIG. 9C, the new super aggregation node 910*d* is a dominant super aggregation node compared to super aggregation node 910*b*. Condition 1] is satisfied because every aggregation node in aggregated communication with super aggregation node 910*b* (e.g., node 910*a* and 910*c*) is also in aggregated communication with super aggregation node 910*d*. Condition 2] is satisfied because super aggregation node 910*d* is in aggregated communication with four aggregation nodes (node 910*a*, node 910*b*, node 910*c* and node 910*g*), while super aggregation node 910*b* is in aggregated communication with only three aggregation nodes (node 910*a*, node 910*b* and node 910*d*). Thus, during step 576, node 910*b* determines that node 910*d* is a dominant super aggregation node. Control passes to step 574 and node 910*b* reverts to an aggregation status of an aggregation node. The result is shown in FIG. 9D; a super aggregated MANET 904 at a third successive time after the second successive time. MANET 904 includes nodes 910 with former super aggregation node 910*b* changed to an aggregation node.

In some embodiments, when a super aggregation node reverts to an aggregation node, during step 574, the node passes its aggregated information on to the dominant super aggregation node. For example, when node 910*b* reverts from super aggregation node in FIG. 9C to aggregation node in FIG. 9D, node 910*b* sends its aggregated route information to the dominant super aggregation node 910*d*. When the aggregation information is routing information, as described in the next section, such passing of information allows minimal disruption in directing traffic, because node 910*d* immediately becomes aware of the routes available in it super domain, without waiting for updates from each of its aggregation nodes.

It is also assumed for purpose of illustration that a MANET is arranged as depicted in FIG. 10A. FIG. 10A, FIG. 10B, FIG. 10C and FIG. 10D illustrate a different example super aggregated network at an initial time and at three successively later times. In FIG. 10A, a super aggregated MANET at an initial time includes multiple aggregation nodes 1050 in aggregated communication with one super aggregation node 1060*a*; thus forming an super aggregation domain 1065*a*. A nearby super aggregated MANET, out of aggregated communication range at an initial time, includes multiple aggregation nodes 1050 in aggregated communication with another super aggregation node 1060*b*; thus forming an aggregation domain 1065*b*. Each aggregation node 1050 includes an aggregation selection process (not shown); and each node is in aggregated communication with one or more other aggregation nodes in its super aggregation domain via aggregated communication links (not shown). Aggregation nodes 1050 in domain 1065*b* are moving toward domain 1065*a* as indicated by arrow 1090.

In FIG. 10B, a super aggregated MANET at a first successive time after the initial time includes overlapping super domain 1065*a* and super domain 1065*b*. In an area of overlap 1065*c*, each aggregation node is in aggregated communication with both super aggregation node 1060*a* and super aggregation node 1060*b*.

In FIG. 10C, a super aggregated MANET at a second successive time after the first successive time includes completely overlapping domain 1065*a* and domain 1065*b* in an area of overlap 1065*c*. Each aggregation node is in aggregated communication with both super aggregation node 1060*a* and super aggregation node 1060*b*. The first super aggregation node to have all its aggregation nodes form aggregated communications with the other super aggregation node, determines that the other super aggregation node is a dominant super aggregation node during step 576. That first super aggregation node loses its aggregation status as a super aggregation node and reverts to an aggregation node during step 574. If both super aggregation nodes revert to aggregation nodes, then this is detected during step 434 and, during step 520 and following steps, both nodes negotiate to a new super aggregation node based on the node with the most aggregated communications with aggregation nodes.

The result is shown in FIG. 10D, which depicts a super aggregated MANET at a third successive time after the second successive time, comprising a single super domain 1065*c* made up of the overlap area. One of the original super aggregation nodes, node 1060*a*, retains its aggregation status as a super aggregation node. The other aggregation node reverts to an aggregation node 1051.

If it is determined, in step 576, that no aggregation node in aggregate communication with the local super aggregation node has changed to a dominant super aggregation node, then control passes to step 580. In step 580, it is determined whether a new aggregation node neighbor has more aggregated communication connections to other aggregated nodes. If not, control passes to step 420 and following steps to process the next message received from a neighboring node.

If it is determined, in step 580, that a new aggregation node neighbor has more aggregated communication connections to other aggregated nodes, then control passes to step 582. In step 582, it is determined whether all aggregation nodes in aggregated communication with the local super aggregation node are also in aggregated communication with the new aggregation node. If so, control passes to step 574 and following steps to change the aggregation status of the local super aggregation node to an aggregation node and to determine any other status changes that result. If not, control passes to step 420 and following steps to process the next message received from a neighboring node.

5.0 Example Routing Aggregation

After determining the node types for each node, and the domains and super domains encompassed by each aggregation node and super aggregation nodes, respectively, routing information propagation and aggregation can be performed, for an illustrated embodiment.

An aggregation node forms a domain that includes directly connected selfish nodes (including intermediate nodes). Each selfish node (including each intermediate node) directly connected to an aggregation node proactively sends reachability information for the subnets (e.g., LAN 112) connected to that node, for example in a standard routing protocol update message. The aggregation node does not send a routing protocol update to the selfish nodes connected to it. An advantage of this embodiment is that bandwidth is conserved. Other nodes in wireless range of the selfish node sending the routing update also receive the routing update. In any domain, only the aggregation node is guaranteed to have complete reachability information for all subnets connected to all selfish nodes in the domain and the subnets connected to the aggregation node itself.

When a subnet in the domain wants to communicate with another subnet connected to a different selfish node in the same domain (or different domain), the originating selfish node looks up the destination in a routing table on the origination selfish node to see whether a route to that subnet already resides in its routing table (for example, as a result of having overhead the routing update of another selfish node sent to the common aggregation node). If not, the originating selfish node treats its aggregation node as a gateway, and sends the data packet to the aggregation node. The aggregation node will have the destination subnet for all subnets in the domain in its routing table and the association with the selfish node that is connected to that destination subnet. The aggregation node forwards the data packet to the selfish node associated with the destination subnet. If the route to the destination subnet already resides in the routing table of the originating selfish node, then the direct route to the other selfish node in wireless range is used.

For example, with reference to FIG. 2A, node 110*o* is the aggregation node for domain 155*e*, and knows all the addresses reachable on the subnets in domain 155*a* because of updates sent from every selfish node to the aggregation node 110*o*. Incidentally, selfish node 110*q* heard the update sent by selfish node 110*r* (and selfish node 110*r* heard the update sent by selfish node 110*q*). Therefore, when a subnet on 110*q* sends a data packet to a subnet on 110*r*, node 110*q* knows to send that data packet over the wireless link to selfish node 110*r*. However, when a subnet on 110*q* sends a data packet to a subnet on 110*s*, node 110*q* does not know the destinations on node 110*s* and does not have a direct path to node 110*s*. Therefore, node 110*q* sends the data packet to aggregation node 110*o*, which has the subnets for subnet 110*r* in its routing table and knows to send the data packet to selfish node 110*s*.

When a selfish node is an intermediate node connected to two or more aggregation nodes, then the originating selfish node treats all its aggregation nodes as gateways, and sends the data packet to all its aggregation node. In some embodiments, a routing request message is also sent to both aggregation nodes. In response, each aggregation node responds with a message indicating the cost to reach the destination through that aggregation node. Future data packets to the same destination are then sent by the selfish node only to the aggregation node that advertised the lowest cost. Any cost metric may be used, including cost metrics that account for quality of service.

Each super aggregation node forms a super domain that includes all aggregation nodes in aggregated communication with the super aggregation node. See FIG. 2B for super domains. All the aggregation nodes in a super domain, send routing updates of aggregated information to the super aggregation node. When a subnet in one domain wants to communicate with another subnet in a different domain, the originating selfish node sends the data packet to the aggregation node, which sends the data packet to its super aggregation node. The super aggregation node will have the destination subnet in its routing table for all subnets in its super domain along with an association with the aggregation node of the domain where the destination subnet resides. The super aggregation node forwards the data packet to the aggregation node associated with the destination subnet.

Neighboring aggregation nodes within direct wireless range will also receive the routing updates sent to the super aggregation node and will be able to update their routing tables incidentally. For example, if aggregation node 110c were within wireless range of aggregation 110f, then when aggregation node 110c sends a routing update to super aggregations node 110j, aggregation node 110f can learn of those routes, and send data packets for a subnet in domain 155a directly to aggregation node 110c.

In the illustrated embodiment, all super aggregation nodes in the network exchange routing updates for the subnets in their super domain. Thus super aggregation node 110j in FIG. 2B sends a routing update that includes subnets reachable from aggregation node 110c (domain 155a), aggregation node 110f (domain 155b) and super aggregation node 110j (domain 155c) to super aggregation node 110l, through intermediate selfish node 110k. Similarly, super aggregation node 110l sends a routing update that includes subnets reachable from aggregation node 110f (domain 155b), aggregation node 110o (domain 155e) and super aggregation node 110l (domain 155d) to super aggregation node 110j, through intermediate selfish node 110k.

These proactive routing updates may be sent using any pro-active routing protocols, such as Optimized Link State Routing ver 2 (OLSR2), OSPF version 3 plus (OSPFv3+), and EIGRP for MANET (EIGRP MANET), already known in the art.

In embodiments in which super aggregation nodes are separated by intervening super aggregation nodes, the outer super aggregation nodes will not know what subnets are in each other. According to an illustrated embodiment, when an originating super aggregation node does not have a destination subnet in its routing table, the originating super aggregation node forwards a route query message that indicates the destination subnet to all super aggregation nodes with which it is in aggregated communication. The intervening super aggregation nodes forward the route query to the super aggregation nodes with which they are in aggregated communication (but not back toward the super aggregation node that sent the query). When a terminating super aggregation node that knows the destination subnet receives the route query message, it sends a route reply message in the reverse direction. The route reply message is forwarded by the intervening super aggregation nodes until it arrives at the originating super aggregation node. In some embodiments, the intervening super aggregation nodes cache the route query and route reply messages and add cost metrics to reach the destination through their super domain. Thus, the originating super aggregation node, the terminating super aggregation node, and the intervening super aggregation nodes can select the best path to forward the query and the reply and future data packets. The cached information can also be used to determine backup paths when a particular super aggregation node becomes unavailable.

The determination of routes among super aggregation nodes separated by intervening super aggregation nodes is an example of on-demand or reactive routing information. Any reactive routing protocol may be used for passing routing updates among super aggregation nodes, such as Ad-Hoc On Demand Distance Vector (AODV) and Dynamic Source Routing (DSR).

6.0 Implementation Mechanisms

Hardware Overview

Figure 11:
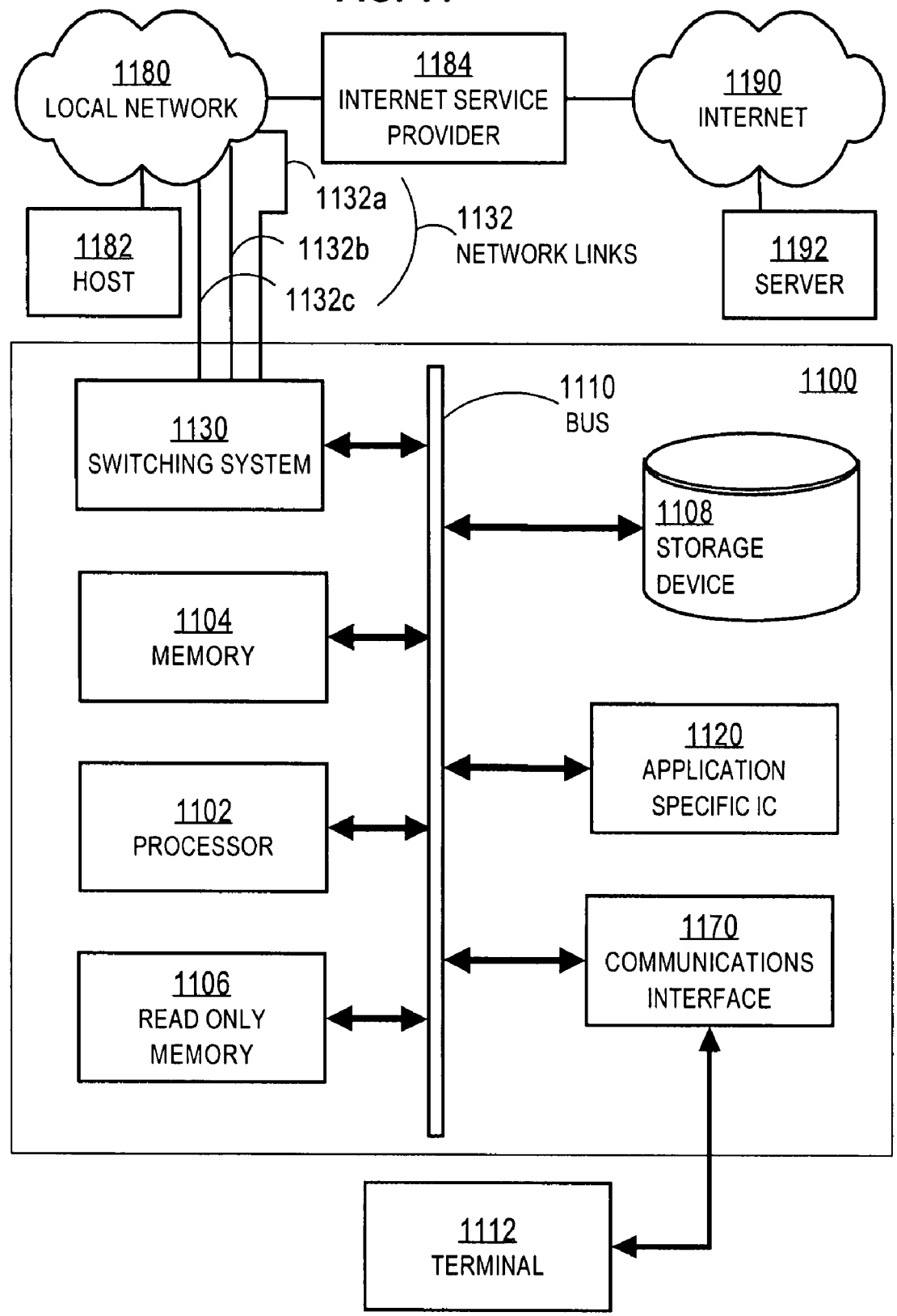
FIG. 11 illustrates a computer system upon which an embodiment of the invention may be implemented.

FIG. 11 illustrates a computer system 1100 upon which an embodiment of the invention may be implemented. The preferred embodiment is implemented using one or more computer programs running on a network element such as a router device. Thus, in this embodiment, the computer system 1100 is a router.

Computer system 1100 includes a communication mechanism such as a bus 1110 for passing information between other internal and external components of the computer system 1100. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 1110 includes many parallel conductors of information so that information is transferred quickly among devices coupled to the bus 1110. One or more processors 1102 for processing information are coupled with the bus 1110. A processor 1102 performs a set of operations on information. The set of operations include bringing information in from the bus 1110 and placing information on the bus 1110. The set of operations also typically include comparing two or more units of information, shifting positions of units of information, and combining two or more units of information, such as by addition or multiplication. A sequence of operations to be executed by the processor 1102 constitutes computer instructions.

Computer system 1100 also includes a memory 1104 coupled to bus 1110. The memory 1104, such as a random access memory (RAM) or other dynamic storage device, stores information including computer instructions. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of computer instructions. The computer system 1100 also includes a read only memory (ROM) 1106 or other static storage device coupled to the bus 1110 for storing static information, including instructions, that is not changed by the computer system 1100. Also coupled to bus 1110 is a non-volatile (persistent) storage device 1108, such as a magnetic disk or optical disk, for storing information, including instructions, that persists even when the computer system 1100 is turned off or otherwise loses power.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made variations in amplitude, frequency, phase, polarization or other physical properties of carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 1110 for use by the processor from an external terminal 1112, such as a terminal with a keyboard containing alphanumeric keys operated by a human user, or a sensor. A sensor detects conditions in its vicinity and transforms those detections into signals compatible with the signals used to represent information in computer system 1100. Other external components of terminal 1112 coupled to bus 1110, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 1112. In some embodiments, terminal 1112 is omitted.

Computer system 1100 also includes one or more instances of a communications interface 1170 coupled to bus 1110. Communication interface 1170 provides a two-way communication coupling via transmission media to a variety of external devices that operate with their own processors, such as printers, scanners, external disks, and terminal 1112. Firmware or software running in the computer system 1100 provides a terminal interface or character-based command interface so that external commands can be given to the computer system. For example, communication interface 1170 may be a parallel port or a serial port such as an RS-232 or RS-422 interface, or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented using carrier waves. For wireless links, the communications interface 1170 sends and receives electrical, acoustic or electromagnetic signals, including infrared and optical signals, which carry information streams, such as digital data.

In the illustrated embodiment, special purpose hardware, such as an application specific integrated circuit (IC) 1120, is coupled to bus 1110. The special purpose hardware is configured to perform operations not performed by processor 1102 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware. Logic encoded in one or more tangible media includes one or both of computer instructions and special purpose hardware.

In the illustrated computer used as a router, the computer system 1100 includes switching system 1130 as special purpose hardware for switching information for flow over a network. Switching system 1130 typically includes multiple communications interfaces, such as communications interface 1170, for coupling to multiple other devices. In general, each coupling is with a network link 1132 that is connected to another device in or attached to a network, such as local network 1180 in the illustrated embodiment, to which a variety of external devices with their own processors are connected. In some embodiments, an input interface or an output interface or both are linked to each of one or more external network elements. Although three network links 1132a, 1132b, 1132c are included in network links 1132 in the illustrated embodiment, in other embodiments, more or fewer links are connected to switching system 1130. Network links 1132 typically provides information communication via transmission media through one or more networks to other devices that use or process the information. For example, network link 1132b may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190. A computer called a server 1192 connected to the Internet provides a service in response to information received over the Internet. For example, server 1192 provides routing information for use with switching system 1130.

The switching system 1130 includes logic and circuitry configured to perform switching functions associated with passing information among elements of network 1180, including passing information received along one network link, e.g. 1132a, as output on the same or different network link, e.g., 1132c. The switching system 1130 switches information traffic arriving on an input interface to an output interface according to pre-determined protocols and conventions that are well known. In some embodiments, switching system 1130 includes its own processor and memory to perform some of the switching functions in software. In some embodiments, switching system 1130 relies on processor 1102, memory 1104, ROM 1106, storage 1108, or some combination, to perform one or more switching functions in software. For example, switching system 1130, in cooperation with processor 1104 implementing a particular protocol, can determine a destination of a packet of data arriving on input interface on link 1132a and send it to the correct destination using output interface on link 1132c. The destinations may include host 1182, server 1192, other terminal devices connected to local network 1180 or Internet 1190, or other routing and switching devices in local network 1180 or Internet 1190.

The invention is related to the use of computer system 1100 for implementing the techniques described herein. According to one embodiment of the invention, those techniques are performed by computer system 1100 in response to processor 1102 executing one or more sequences of one or more instructions contained in memory 1104. Such instructions, also called software and program code, may be read into memory 1104 from another computer-readable medium such as storage device 1108. Execution of the sequences of instructions contained in memory 1104 causes processor 1102 to perform the method steps described herein. In alternative embodiments, hardware, such as application specific integrated circuit 1120 and circuits in switching system 1130, may be used in place of or in combination with software to implement the invention. Thus, embodiments of the invention are not limited to any specific combination of hardware and software, unless otherwise explicitly stated.

The signals transmitted over network link 1132 and other networks via transmission media through communications interfaces such as interface 1170, carry information to and from computer system 1100. Computer system 1100 can send and receive information, including program code, through the networks 1180, 1190 among others, through network links 1132 and communications interfaces such as interface 1170. In an example using the Internet 1190, a server 1192 transmits program code for a particular application, requested by a message sent from computer 1100, through Internet 1190, ISP equipment 1184, local network 1180 and network link 1132b through communications interface in switching system 1130. The received code may be executed by processor 1102 or switching system 1130 as it is received, or may be stored in storage device 1108 or other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1132b. An infrared detector serving as communications interface in switching system 1130 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102 or switching system 1130.

7.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
determining, at a local node in a network that comprises a plurality of nodes, a first neighbor node of one or more neighbor nodes with which the local node is in direct communication based on a first number of nodes with which the first neighbor node is in direct communication; and
selecting the first neighbor node as an aggregation node for information about the local node,
wherein the aggregation node outputs data that is a combination of data received from a plurality of different nodes and a number of neighbor nodes with which the local node is in direct communication is called a local number, wherein determining the first neighbor node further comprises determining that the first number of nodes is greater than the local number, and that no other neighbor node of the local node is in direct communication with more nodes than the first number of nodes.

2. A method as recited in claim 1, wherein the direct communication between neighbors is a wireless communication between neighbors and the network is a mobile ad hoc network (MANET).

3. A method as recited in claim 1, wherein the information is routing information about network addresses of one or more devices connected to the local node.

4. A method as recited in claim 1, said step of determining the first neighbor node further comprising:
transmitting from the local node a message that includes local count data that indicates the local number of neighbor nodes;
receiving from each neighbor node a message that includes corresponding neighbor count data that indicates a corresponding number of one or more nodes with which the corresponding neighbor node is in direct communication; and
in response to receiving the message from every neighbor node, determining the first neighbor node.

5. A method as recited in claim 1, said step of selecting the first neighbor node as the aggregation node further comprising:
sending to the first neighbor node a register message that includes registration data that indicates the first neighbor node is the aggregation node for the local node; and
sending to the first neighbor node, an update message that includes information about the local node.

6. A method as recited in claim 5, said step of sending the update message further comprising sending the update message prior to receiving a request message from the first neighbor node for information.

7. A method as recited in claim 1, said step of determining the first neighbor node further comprising determining whether the local node received from the first neighbor node a message that includes aggregation advertising data that indicates the first neighbor node is an aggregation node for at least one node in direct communication with the first neighbor node.

8. A method as recited in claim 1, further comprising:
receiving from a second neighbor node a register message that includes registration data that indicates the local node is the aggregation node for the second neighbor node; and
in response to receiving the register message, transmitting from the local node a message that includes aggregation data that indicates the local node is an aggregation node for at least one neighbor node.

9. A method as recited in claim 8, further comprising receiving from the second neighbor node, an update message that includes information about the second neighbor node.

10. A method as recited in claim 8, said step of transmitting from the local node a message that includes aggregations data further comprising:
determining that the second node remains in direct communication with the local node for a minimum time; and
if it is determined that the second node remains in direct communication with the local node for a minimum time, then transmitting from the local node the message that includes aggregations data that indicates the local node is an aggregation node for at least one neighbor node.

11. A method as recited in claim 8, said step of transmitting from the local node a message that includes aggregations data further comprising transmitting from the local node the message that includes aggregations data that indicates the local node is an aggregation node and node identification data that indicates the second neighbor node.

12. A method as recited in claim 1, further comprising:
determining that the local node is an aggregation node for at least one neighbor node;
determining, at the local node, a second node that is an aggregation node based on a second number of aggregation nodes in communication with the second neighbor node; and
selecting the second node as a higher level aggregation node for information about one or more aggregation nodes in communication with the second neighbor node.

13. An apparatus comprising:
means for determining, at a local node in a network that comprises a plurality of nodes, a first neighbor node of one or more neighbor nodes with which the local node is in direct communication based on a first number of nodes with which the first neighbor node is in direct communication; and
means for selecting the first neighbor node as an aggregation node for information about the local node,
wherein the aggregation node outputs data that is a combination of data received from a plurality of different nodes and a number of neighbor nodes with which the local node is in direct communication is called a local number, wherein determining the first neighbor node further comprises determining that the first number of nodes is greater than the local number, and that no other neighbor node of the local node is in direct communication with more nodes than the first number of nodes.

14. An apparatus comprising:
a network interface that is configured for communicating a data packet with a packet-switched network that comprises a plurality of node;
logic encoded in one or more tangible media for execution and, when executed, operable for:
determining a first neighbor node of one or more neighbor nodes with which the apparatus is in direct communication through the network interface, based on a first number of nodes with which the first neighbor node is in direct communication; and
selecting the first neighbor node as an aggregation node for information about the apparatus,
wherein the aggregation node outputs data that is a combination of data received from a plurality of different nodes and a number of neighbor nodes with which a local node is in direct communication is called a local number, wherein determining the first neighbor node further comprises determining that the first number of nodes is greater than the local number, and that no other neighbor node of the local node is in direct communication with more nodes than the first number of nodes.

15. An apparatus as recited in claim 14, wherein the network interface is a wireless interface and direct communication between neighbors is a wireless communication between neighbors and the network is a mobile ad hoc network (MANET).

16. An apparatus as recited in claim 14, wherein the information is routing information about network addresses of one or more devices connected to the apparatus.

17. An apparatus as recited in claim 14, said determining the first neighbor node further comprising:
sending through the network interface a message that includes local count data that indicates the local number of neighbor nodes;
receiving through the network interface from each neighbor node a message that includes corresponding neighbor count data that indicates a corresponding number of one or more nodes with which the corresponding neighbor node is in direct communication; and
in response to receiving the message from every neighbor node, determining the first neighbor node.

18. An apparatus as recited in claim 14, said selecting the first neighbor node as the aggregation node further comprising:
sending through the network interface to the first neighbor node a register message that includes registration data that indicates the first neighbor node is the aggregation node for the apparatus; and
sending to the first neighbor node, an update message that includes information about the apparatus.

19. An apparatus as recited in claim 18, said sending the update message further comprising sending the update message prior to receiving a request message from the first neighbor node for information.

20. An apparatus as recited in claim 14, said determining the first neighbor node further comprising determining whether the apparatus received through the network interface from the first neighbor node a message that includes aggregation advertising data that indicates the first neighbor node is an aggregation node for at least one node in direct communication with the first neighbor node.

\* \* \* \* \*